(12) United States Patent
Kim et al.

(10) Patent No.: US 12,078,780 B2
(45) Date of Patent: Sep. 3, 2024

(54) OPTICAL HYBRID LENS, METHOD FOR MANUFACTURING THE SAME, AND APPARATUS EMPLOYING THE SAME

(71) Applicant: SAMSUNG ELECTRONICS CO., LTD., Suwon-si (KR)

(72) Inventors: Seaum Kim, Seoul (KR); Hyunsung Park, Suwon-si (KR); Seunghoon Han, Seoul (KR); Hyeonsoo Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 245 days.

(21) Appl. No.: 17/371,387

(22) Filed: Jul. 9, 2021

(65) Prior Publication Data

US 2022/0082794 A1    Mar. 17, 2022

(30) Foreign Application Priority Data

Sep. 17, 2020  (KR) .......................... 10-2020-0120028

(51) Int. Cl.
  *G02B 13/00* (2006.01)
  *G02B 1/00* (2006.01)
  *G02B 27/00* (2006.01)

(52) U.S. Cl.
  CPC .......... *G02B 13/003* (2013.01); *G02B 1/002* (2013.01); *G02B 27/0025* (2013.01)

(58) Field of Classification Search
  CPC . G02B 1/002; G02B 1/10; G02B 3/00; G02B 13/003; G02B 27/0025
  See application file for complete search history.

(56) References Cited

U.S. PATENT DOCUMENTS

| | | | |
|---|---|---|---|
| 9,664,817 B1 | 5/2017 | Di Falco | |
| 10,338,275 B1 | 7/2019 | Acosta et al. | |
| 2013/0229704 A1 | 9/2013 | Smolyaninov | |
| 2016/0320531 A1 | 11/2016 | Kamali et al. | |
| 2018/0188553 A1 | 7/2018 | Elsinger | |
| 2019/0196220 A1* | 6/2019 | Macinnis | G02C 7/022 |
| 2020/0166783 A1* | 5/2020 | Roy | B82Y 20/00 |
| 2020/0225386 A1* | 7/2020 | Tsai | G02B 1/002 |
| 2021/0271000 A1 | 9/2021 | Park et al. | |

FOREIGN PATENT DOCUMENTS

| | | |
|---|---|---|
| WO | 2017001508 A1 | 1/2017 |
| WO | 2018204856 A1 | 11/2018 |
| WO | 2019164849 A1 | 8/2019 |
| WO | 2020097319 A1 | 5/2020 |

OTHER PUBLICATIONS

Kamali, S., et al., "Decoupling optical function and geometrical form using conformal flexible dielectric metasurfaces", Nature Communications, 7:11618, May 19, 2016, pp. 1-7.

\* cited by examiner

*Primary Examiner* — Jack Dinh
(74) *Attorney, Agent, or Firm* — Sughrue Mion, PLLC

(57) ABSTRACT

An optical hybrid lens includes a refractive lens having a curved lens surface, a metalens including at least one metasurface formed on the curved lens surface to follow the curved lens surface of the refractive lens and including a plurality of nanostructures having a shape dimension of a sub-wavelength of incident light, and an adhesive layer between the curved lens surface of the refractive lens and the metalens. The metalens includes at least one metasurface including a plurality of nanostructures having a shape dimension of a sub-wavelength of incident light.

8 Claims, 19 Drawing Sheets

OPTICAL HYBRID LENS, METHOD FOR MANUFACTURING THE SAME, AND APPARATUS EMPLOYING THE SAME

CROSS-REFERENCE TO RELATED APPLICATION

This application is based on and claims priority under 35 U.S.C. § 119 to Korean Patent Application No. 10-2020-0120028, filed on Sep. 17, 2020, in the Korean Intellectual Property Office, the disclosure of which is incorporated by reference herein in its entirety.

BACKGROUND

1. Field

The disclosure relates to an optical hybrid lens, a method of manufacturing the same, and an apparatus including the same.

2. Description of Related Art

A lens module is an essential element in an optical system to acquire an image. In order to obtain a high-quality image, the lens module has a structure including a plurality of single lenses aligned on the same optical axis, and some lens modules including a plurality of lenses have a doublet of a convex lens and a concave lens in order to remove various aberrations that degrade image quality. Such a configuration increases the total length of the lens module, so that it is difficult to miniaturize an imaging system.

For example, in the case of a device that requires creating high-quality images in a small area, such as a mobile phone camera, due to the limitation of the form factor of the existing lens module, the camera unit may have a protruding structure. In addition, it is difficult to implement optical elements such as projectors, cameras, and sensors in a limited space of augmented reality (AR) glasses, etc., based on the existing lens module.

Accordingly, a method of miniaturizing the lens module while removing various aberrations by using a thin metasurface-based lens is needed.

SUMMARY

The disclosure provides an optical hybrid lens including a metalens, a method of manufacturing the same, and an apparatus including the same.

Additional aspects will be set forth in part in the description which follows and, in part, will be apparent from the description, or may be learned by practice of embodiments of the disclosure.

In accordance with an aspect of the disclosure, an optical hybrid lens includes a refractive lens including a curved lens surface; a metalens including at least one metasurface formed on the curved lens surface to follow the curved lens surface of the refractive lens, the metalens including a plurality of nanostructures having a shape dimension of a sub-wavelength of incident light; and an adhesive layer between the curved lens surface of the refractive lens and the metalens.

The metalens may be formed to match a curvature of the curved lens surface of the refractive lens.

The adhesive layer may include an adhesive material that has at least one of optical transparency and a refractive index that matches a refractive index of the refractive lens.

The adhesive layer may have a thickness of about 1 µm to about 50 µm.

The curved lens surface of the refractive lens may include any one of a convex lens surface, a concave lens surface, and a composite curved lens surface.

The curved lens surface of the refractive lens may include an aspherical surface, and the metalens may be formed to match the aspherical surface.

The at least one metasurface may include a plurality of metasurfaces, and the metalens may further include a first dielectric layer between adjacent metasurfaces of the plurality of metasurfaces.

Each metasurface of the plurality of metasurfaces may include a plurality of first nanostructures, each first nanostructure of the plurality of first nanostructures including a high refractive index column and a first surrounding material having a low refractive index; or a plurality of second nanostructures, each second nanostructure of the plurality of second nanostructures including a low refractive index column and a second surrounding material having a high refractive index.

The plurality of nanostructures may include a high refractive index column and a first surrounding material having a low refractive index; or a low refractive index column and a second surrounding material having a high refractive index.

The optical hybrid lens may further include a second dielectric layer between the metalens and the adhesive layer.

An imaging device may include a lens assembly including the optical hybrid lens of an above-noted aspect of the disclosure and at least one other refractive lens; and an image sensor configured to convert an optical image formed by the lens assembly into an electrical image signal.

In accordance with an aspect of the disclosure, a method of manufacturing an optical hybrid lens includes forming a metalens on a substrate, the metalens including at least one metasurface including a plurality of nanostructures with a shape dimension of a sub-wavelength of incident light; forming an adhesive layer by applying an adhesive on the metalens to form a stacked structure of the metalens and the adhesive layer; removing the substrate from an area of the metalens to form a space for forming the optical hybrid lens; fixing the stacked structure to a first mold by disposing the first mold at the area of the metalens, the first mold including a first engraved structure corresponding to a curved lens surface of a refractive lens; combining a second mold with the first mold, the second mold including a second engraved structure corresponding to a counter lens surface of the refractive lens, so that the first engraved structure and the second engraved structure face each other with the stacked structure therebetween; causing the stacked structure to be in close contact with a surface of the first engraved structure and injecting an injection material into the second mold for forming the refractive lens; and removing the first mold and the second mold after firing the injection material to obtain the optical hybrid lens including the adhesive layer and the metalens on the curved lens surface of the refractive lens.

The method may further include temporarily adhering the adhesive layer to a carrier substrate, wherein the removing of the substrate occurs in a state in which the adhesive applied on the metalens is temporarily adhered to the carrier substrate, and wherein the carrier substrate and the adhesive layer are separated from each other to remove the carrier substrate in a state in which the stacked structure is fixed to the first mold.

The causing of the stacked structure to be in close contact with the surface of the first engraved structure may include inducing a vacuum between the first engraved structure and the stacked structure.

The metalens may match a curvature of the curved lens surface of the refractive lens, and the curved lens surface of the refractive lens may include any one of a convex lens surface, a concave lens surface, and a composite curved lens surface.

The adhesive layer may include an adhesive material that has at least one of optical transparency and a refractive index that matches a refractive index of the refractive lens.

The adhesive layer may have a thickness of about 1 μm to about 50 μm.

The forming the metalens may include forming a plurality of metasurfaces, and the method may further include forming a first dielectric layer between adjacent metasurfaces of the plurality of metasurfaces.

Each metasurface of the plurality of metasurfaces may include a plurality of first nanostructures, each first nanostructure of the plurality of first nanostructures including a high refractive index column and a first surrounding material having a low refractive index; or a plurality of second nanostructures, each second nanostructure of the plurality of second nanostructures including a low refractive index column and a second surrounding material having a high refractive index.

The at least one metasurface may include a plurality of first nanostructures, each first nanostructure of the plurality of first nanostructures including a high refractive index column and a first surrounding material having a low refractive index; or a plurality of second nanostructures, each second nanostructure of the plurality of second nanostructures including a low refractive index column and a second surrounding material having a high refractive index.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
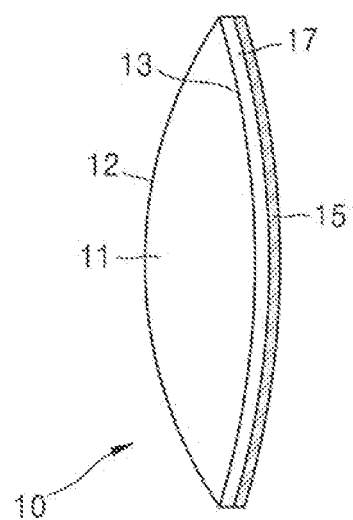
FIGS. 1, 2A, 2B, 3A, 3B, and 4 show optical hybrid lenses according to embodiments.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments will be described in detail with reference to the accompanying drawings. In the following drawings, the same reference numerals refer to the same components, and the size of each component in the drawings may be exaggerated for clarity and convenience of description. Embodiments described below are merely examples, and various modifications may be made from these embodiments.

Hereinafter, what is described as "upper part" or "on" may include not only those directly above by contact, but also those above and not in contact. Terms such as first and second may be used to describe various elements, but are used only for the purpose of distinguishing one element from other elements. These terms do not limit the material or structure of the components. The terms of a singular form may include plural forms unless otherwise specified. In addition, when a certain part "includes" a certain component, it means that other components may be further included rather than excluding other components unless otherwise stated. The use of the term "the" and similar designating terms may correspond to both the singular and the plural.

Lens groups in the imaging device use a convex lens and a concave lens together to remove aberration, and the introduction of the concave lens may reduce the optical power of the imaging device and increase the total length of the imaging apparatus. In addition, as the size of the image sensor increases, the size of the imaging device is required to increase in proportion but it may be difficult to implement the device in a limited space due to the limited form factor of the imaging device.

According to the optical hybrid lens according to an embodiment, an adhesive layer is formed on the refractive lens, and a metalens is formed on the adhesive layer, so that the adhesive layer and the metalens are formed to follow the shape of the refractive lens. In this case, the refractive lens may be any convex lens, concave lens, or aspherical lens. Aberration compensation can be performed by forming the metalens to have chromatic aberration characteristics opposite to that of the refractive lens. In addition, since the metalens can replace the function of the concave lens for correcting geometric aberration and chromatic aberration, the total length of the lens module can be reduced. When the optical hybrid lens according to this embodiment is applied, the imaging system can be miniaturized, and even when generating high-quality images in a small area such as a mobile phone camera, the device can be implemented without the camera unit protruding from the mobile phone surface. In addition, when applying the optical hybrid lens according to an embodiment, it is possible to implement optical elements such as projectors, cameras, and sensors in a limited space in AR glasses.

FIG. 1 shows an optical hybrid lens 10 according to an embodiment.

Referring to FIG. 1, the optical hybrid lens 10 includes a refractive lens 11 having a curved lens surface 13, a metalens 15 formed on the curved lens surface 13 of the refractive lens 11 so as to follow the curvature of the curved lens surface 13 of the refractive lens 11, and an adhesive layer 17 introduced between the curved lens surface 13 of the refractive lens 11 and the metalens 15.

The refractive lens 11 may be any convex lens, concave lens, or aspherical lens. The refractive lens 11 may include a curved lens surface 13 on the side facing the metalens 15 and a counter lens surface 12 on the opposite side. The counter lens surface 12 may be a flat or curved lens surface. For example, in the refractive lens 11 shown in FIG. 1, both lens surfaces may be formed as curved lens surfaces. As another example, one lens surface may be a curved lens surface, and the other lens surface may be a flat surface.

The metalens 15 may be formed to have a reverse dispersion characteristic with respect to the refractive lens 11. For this, the metalens 15 may include at least one metasurface to have a desired refractive power while reducing chromatic aberration and/or geometric aberration. The metasurface includes a plurality of nanostructures having a shape dimension of a sub-wavelength of incident light so as to implement a predetermined transmission phase distribution by modulating the phase of the incident light according to the position. For example, the metasurface may include a plurality of nanostructures in a columnar shape. In addition, the metasurface may be composed of a plurality of nanostructures (i.e., first nanostructures) having a high refractive index columnar shape and a low refractive index surrounding material (i.e., first surrounding material), or may be formed of a plurality of nanostructures (i.e., second nanostructures) having a low refractive index columnar shape and a high refractive index surrounding material (i.e., second surrounding material). In addition, the plurality of nanostructures may have a shape including an inner pillar and a shell pillar surrounding the inner pillar. When the metalens 15 includes a plurality of metasurfaces, a dielectric layer may be further provided between the metasurfaces. The dielectric layer may also be provided between the metalens 15 and the adhesive layer 17. For example, the metalens 15 has at least one metasurface, and a dielectric layer is provided on the side facing the adhesive layer 17 of the metasurface to be located on the side of the adhesive layer 17, so that the dielectric layer may be provided between the metalens 15 and the adhesive layer 17. The dielectric layer may serve as a spacer layer.

The metalens 15 may be provided on the curved lens surface 13 of the refractive lens 11. In order to form the optical hybrid lens 10, the metalens 15 may be formed to follow the curvature of the curved lens surface 13 of the refractive lens 11. That is, the metalens 15 may be formed to match the curvature of the curved lens surface 13 of the refractive lens 11. When both lens surfaces of the refractive lens 11 are curved lens surfaces, the metalens 15 may be provided on one curved lens surface of the refractive lens 11 or may be provided on each of the two curved lens surfaces.

FIG. 1 shows an example in which the adhesive layer 17 and the metalens 15 are provided on the curved lens surface 13 of the refractive lens 11.

The adhesive layer 17 may be introduced between the curved lens surface 13 of the refractive lens 11 and the metalens 15. Like the metalens 15, the adhesive layer 17 may be formed to follow the curvature of the curved lens surface 13 of the refractive lens 11. That is, the adhesive layer 17 may be formed to match the curvature of the curved lens surface 13 of the refractive lens 11.

In this way, the metalens 15 and the adhesive layer 17 may be formed to match the curvature of the curved lens surface 13 of the refractive lens 11.

Furthermore, in the optical hybrid lens 10 according to an embodiment, the adhesive layer 17 may be composed of an adhesive material that satisfies at least one of an optically transparent condition and a refractive index condition that match the refractive index of the refractive lens 11. In other words, the adhesive material may have at least one of optical transparency and a refractive index condition that matches the refractive index of the refractive lens. The adhesive layer 17 may perform additional optical functions such as anti-reflection.

The adhesive layer 17 may have a thickness in the range of, for example, about 1 μm to about 50 μm, and may be formed of a material having high transmittance, for example, a material having a transmittance of about 99% or more in a visible light region, for example, about 400 nm to about 700 nm wavelength range. For example, the adhesive layer 17 may be formed of an optically transparent adhesive commonly used in wafer bonding or temporary bonding de-bonding (TBDB) processes such as UV curable polymer, thermoplastic, thermoset, or the like.

Meanwhile, in the optical hybrid lens 10 according to an embodiment, the refractive lens 11 may be formed in various shapes in which at least one lens surface is a curved lens surface 13.

In FIG. 1, an example is shown with a structure in which the optical hybrid lens 10 according to the embodiment includes a refractive lens 11 having a convex lens surface as a curved lens surface 13, the metalens 15 is formed along the curvature of the convex lens surface of the refractive lens 11, and the adhesive layer 17 is introduced between the convex lens surface and the metalens 15. In this case, the metalens 15 and the adhesive layer 17 may be formed to be curved to match the shape of the curved lens surface 13, for example, the convex lens surface. As another example, the curved lens surface 13 of the refractive lens 11 may be an aspherical convex lens surface, and in this case, the metalens 15 and the adhesive layer 17 may be formed to be curved to match the aspherical shape of the curved lens surface 13 of the refractive lens 11. FIG. 1 illustrates a case in which the refractive lens 11 has a biconvex lens shape, and the refractive lens 11 may be a lens of various shapes having at least one convex lens surface.

FIGS. 2A, 2B, 3A, 3B, and 4 show optical hybrid lenses 20, 30, 50, 60, and 70 according to various embodiments. The optical hybrid lens 20 of FIG. 2A includes a refractive lens 21 having a curved lens surface 23, a metalens 25, and an adhesive layer 27 as a configuration corresponding to the refractive lens 11 having a curved lens surface 13, the metalens 15, and the adhesive layer 17 of the optical hybrid lens 10 of FIG. 1. The optical hybrid lens 30 of FIG. 2B includes a refractive lens 31 having a curved lens surface 33, a metalens 35, and an adhesive layer 37 as a configuration corresponding to the refractive lens 11 having a curved lens surface 13, the metalens 15, and the adhesive layer 17 of the optical hybrid lens 10 of FIG. 1. The optical hybrid lens 50 of FIG. 3A includes a refractive lens 51 having a curved lens surface 53, a metalens 55, and an adhesive layer 57 as a configuration corresponding to the refractive lens 11 having a curved lens surface 13, the metalens 15, and the adhesive layer 17 of the optical hybrid lens 10 of FIG. 1. The optical hybrid lens 60 of FIG. 3B includes a refractive lens 61 having a curved lens surface 63, a metalens 65, and an adhesive layer 67 as a configuration corresponding to the refractive lens 11 having a curved lens surface 13, the metalens 15, and the adhesive layer 17 of the optical hybrid lens 10 of FIG. 1. The optical hybrid lens 70 of FIG. 4 includes a refractive lens 71 having a curved lens surface 73, a metalens 75, and an adhesive layer 77 as a configuration corresponding to the refractive lens 11 having a curved lens surface 13, the metalens 15, and the adhesive layer 17 of the optical hybrid lens 10 of FIG. 1. In the optical hybrid lenses 20, 30, 50, 60, and 70 of FIGS. 2 to 4, the metalenses 25, 35, 55, 65, and 75 may be formed to have reverse dispersion characteristics with the refractive lenses 21, 31, 51, 61, and 71.

Figure 2A:
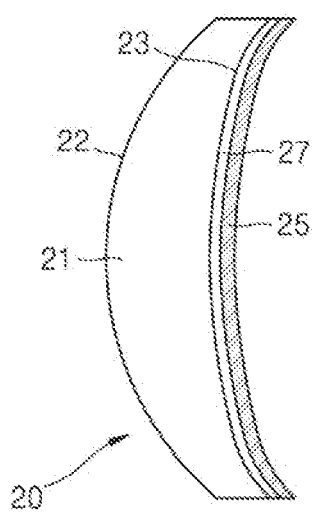

FIG. 2A illustrates an example in which the optical hybrid lens 20 is formed with a structure that the refractive lens 21 having a concave lens surface as the curved lens surface 23 and the metalens 25 on the concave lens surface of the refractive lens 21 to match the curvature of the concave lens surface are formed, and the adhesive layer 27 is introduced between the concave lens surface and the metalens 25. In this case, the metalens 25 and the adhesive layer 27 may be formed to be curved to match the shape of the concave lens surface. The concave lens surface of the refractive lens 21 may be an aspherical surface, and in this case, the metalens 25 and the adhesive layer 27 may be formed to be curved to match the aspherical shape of the concave lens surface of the refractive lens 21.

FIG. 2A illustrates an example in which the refractive lens 21 has a concave lens surface as the curved lens surface 23 and a convex lens surface 22 on the opposite surface, so as to have a meniscus lens shape. However, the refractive lens 21 may be a lens of various shapes having at least one concave lens surface.

As shown in FIG. 2A, when a meniscus lens is provided as the refractive lens 21, the curved lens surface 23 on which the metalens 25 is formed may be a concave lens surface or a convex lens surface. FIG. 2A shows an example in which the metalens 25 is formed on the concave lens surface of the refractive lens 21 so as to match the curvature of the concave lens surface.

Figure 2B:
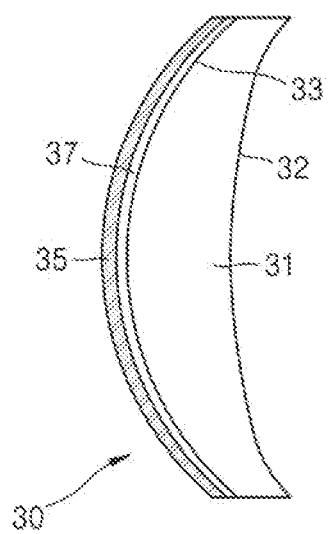

In FIG. 2B, an example is shown in which the optical hybrid lens 30 is formed with a structure that the refractive lens 31 having a convex lens surface as the curved lens surface 33 and the metalens 35 on the convex lens surface of the refractive lens 31 to match the curvature of the convex lens surface are formed, and the adhesive layer 37 is introduced between the convex lens surface and the metalens 35. In this case, the metalens 35 and the adhesive layer 37 may be formed to be curved to match the shape of the convex lens surface. The convex lens surface of the refractive lens 31 may be an aspherical surface, and in this case, the metalens 35 and the adhesive layer 37 may be formed to be curved to match the aspherical shape of the convex lens surface of the refractive lens 31.

FIG. 2B illustrates an example in which the refractive lens 31 has a convex lens surface as the curved lens surface 33, and has a concave lens surface 32 on the opposite surface, so as to have a meniscus lens shape. However, the refractive lens 31 may be a lens of various shapes having at least one convex lens surface.

As shown in FIGS. 2A and 2B, when a meniscus lens is provided as the refractive lenses 21 and 31, the curved lens surfaces 23 and 33 on which the metalenses 25 and 35 are formed may be a concave lens surface or a convex lens surface. FIG. 2A shows an example in which the metalens 25 is formed to match the curvature of the concave lens surface of the refractive lens 21, and FIG. 2B shows an example in which the metalens 35 is formed on the convex lens surface of the refractive lens 31 so as to match the curvature of the convex lens surface.

As shown in FIG. 2A, when a meniscus lens is provided as the refractive lens 21, the metalens 15 and the adhesive layer 17 may be formed to match the curvature on the concave lens surface of the refractive lens 21. In addition, as shown in FIG. 2B, when a meniscus lens is provided as the refractive lens 31, the metalens 35 and the adhesive layer 37 may be formed to match the curvature on the convex lens surface of the refractive lens 31.

That is, as illustrated in FIGS. 2A and 2B, when a meniscus lens is provided as the refractive lenses 21 and 31, the metalenses 25 and 35 and the adhesive layers 27 and 37 may be formed to match the curvature on the concave or convex lens surfaces of the refractive lenses 21 and 31. For example, when a meniscus lens is provided as the refractive lenses 21 and 31, the convex lens surface or the concave lens surface of the refractive lenses 21 and 31 may be aspherical, and the metalenses 25 and 35 and the adhesive layers 27 and 37 may be formed to be curved to match the aspherical shape of the convex lens surface or the concave lens surface of the refractive lenses 21 and 31.

Figure 3A:
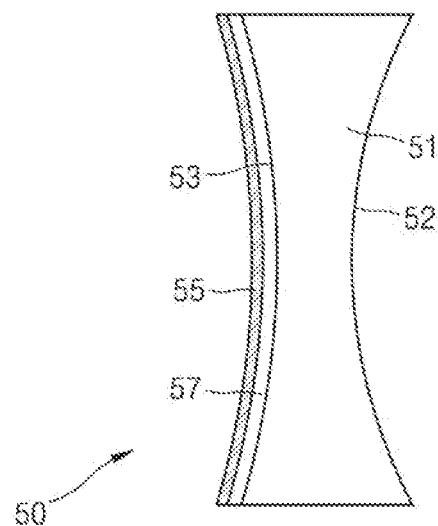

FIG. 3A illustrates an example in which the optical hybrid lens 50 is formed with a structure that the refractive lens 51 having a first concave lens surface as the curved lens surface 53 and the metalens 55 on the first concave lens surface of the refractive lens 51 to match the curvature of the first concave lens surface are formed, and the adhesive layer 57 is introduced between the first concave lens surface and the metalens 55. In this case, the metalens 55 and the adhesive layer 57 may be formed to be curved to match the shape of the first concave lens surface. The first concave lens surface of the refractive lens 51 may be an aspherical surface, and in this case, the metalens 55 and the adhesive layer 57 may be formed to be curved to match the aspherical shape of the first concave lens surface of the refractive lens 51.

FIG. 3A illustrates an example in which the refractive lens 51 has a first concave lens surface as the curved lens surface 53 and a second concave lens surface 52 on the opposite surface, so as to have the shape of biconcave lens. However, the refractive lens 51 may be a concave lens of various shapes having a concave lens surface as the curved lens surface 53.

Figure 3B:
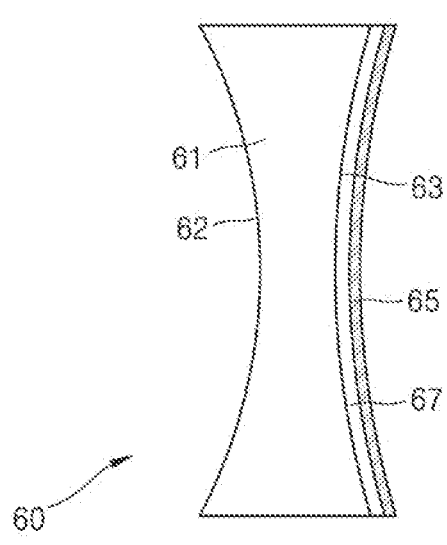

FIG. 3B illustrates an example in which the optical hybrid lens 60 is formed with a structure that the refractive lens 61 having a second concave lens surface as the convex lens surface 63 and the metalens 65 on the second concave lens surface of the refractive lens 61 to match the curvature of the second concave lens surface are formed, and the adhesive layer 67 is introduced between the second concave lens surface and the metalens 65. In this case, the metalens 65 and the adhesive layer 67 may be formed to be curved to match the shape of the second concave lens surface. The convex lens surface of the refractive lens 61 may be an aspherical surface, and in this case, the metalens 65 and the adhesive layer 67 may be formed to be curved to match the aspherical shape of the convex lens surface of the refractive lens 61.

FIG. 3B illustrates an example in which the refractive lens 61 has a second concave lens surface as the curved lens surface 63 and a first concave lens surface 62 on the opposite surface, so as to have the shape of a biconcave lens. However, the refractive lens 61 may be a concave lens of various shapes having a concave lens surface as the curved lens surface 63.

As shown in FIGS. 3A and 3B, when a concave lens is provided as the refractive lenses 51 and 61, the curved lens surfaces 53 and 63 on which the metalenses 55 and 65 are formed may be concave lens surfaces.

As illustrated in FIGS. 3A and 3B, when the refractive lens surfaces 53 and 63 are provided with a concave lens surface to form a concave lens as the refractive lens 51 and 61, the metalenses 55 and 65 and the adhesive layers 57 and 67 may be formed on the refractive lens surfaces 53 and 63 of the refractive lenses 51 and 61 to match the concave lens surface curvature. For example, when a concave lens is provided as the refractive lenses 51 and 61, the concave lens surfaces corresponding to the curved lens surfaces 53 and 63 of the refractive lenses 51 and 61 may be aspherical, and the metalenses 55 and 65 and the adhesive layers 57 and 67 may be formed to be curved to match the aspherical shape of the concave lens surface corresponding to the curved lens surfaces 53 and 63 of the refractive lenses 51 and 61.

As another example, in the optical hybrid lens 20, 30, 50, and 60, the refractive lenses 21, 31, 51, and 61 may be a plano-convex lens or a plano-concave lens, and the metalenses 25, 35, 55, and 65 and the adhesive layers 27, 37, 57, and 67 may be formed to match the convex lens surface of the plano-convex lens or the concave lens surface of the plano-concave lens.

As described above, in the optical hybrid lenses 20, 30, 50, and 60, at least one surface of the refractive lenses 21, 31, 51, and 61 may be formed of a convex lens surface or a concave lens surface as the curved lens surfaces 23, 33, 53, and 63, and the metalenses 25, 35, 55, and 65 and the adhesive layers 27, 37, 57, and 67 may be formed to match the curvature of the curved lens surfaces 23, 33, 53, and 63 of the refractive lenses 21, 31, 51, and 61, for example, a convex lens surface or a concave lens surface.

Figure 4:
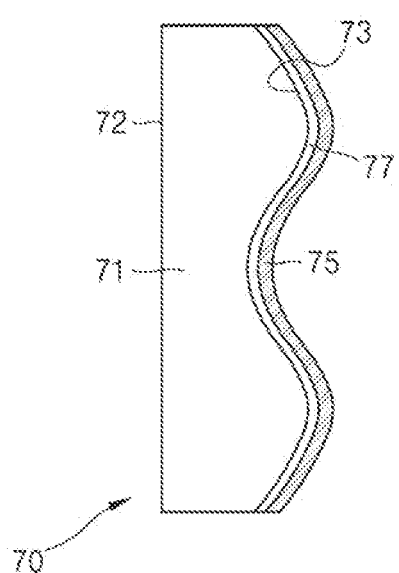

In FIG. 4, an example is shown in which the optical hybrid lens 70 is formed with a structure that the refractive lens 71 having a flat surface as one surface and a complex curved lens surface 73 as a curved lens surface of the opposite surface, and the metalens 75 to match of the curvature of the complex curved lens surface 73 of the refractive lens 71 are formed, and the adhesive layer 77 is introduced between the complex curved lens surface 73 and the metalens 75. Here, the complex curved lens surface 73 refers to a curved lens surface having two or more vertices or valleys when viewed in cross section. FIG. 4 shows an example in which the complex curved lens surface 73 is formed as a curved surface having two vertices and a valley therebetween when viewed in cross section. The complex curved lens surface 73 of the refractive lens 71 may be an aspherical surface, and the metalens 75 and the adhesive layer 77 may be formed to match the aspherical shape of the complex curved lens surface 73.

In the optical hybrid lenses 10, 20, 30, 50, 60, and 70 according to various embodiments as described above, the refractive lens may be formed in various shapes in which at least one lens surface is a curved lens surface, and a metalens and an adhesive layer are formed along the curved lens surface, so that the metalens may also be curved. In FIGS. 1 to 4, the shapes of the optical hybrid lenses 10, 20, 30, 50, 60, and 70 are shown as examples, and embodiments are not limited thereto, and the refractive lens may have at least one curved lens surface, and may have various shapes within the range in which the metalens and the adhesive layer are formed so as to match the curvature on the curved lens surface. In this case, the curved lens surface on which the metalens is formed may be a concave lens surface, a convex lens surface, or an aspherical lens surface. In this way, the refractive lens may be any convex lens, concave lens, or aspherical lens.

In the optical hybrid lenses 10, 20, 30, 50, 60, and 70, the metalenses 15, 25, 35, 55, 65, and 75 may be formed to have a reverse dispersion characteristic with the refractive lenses 11, 21, 31, 51, 61, and 71. According to the optical hybrid lenses 10, 20, 30, 50, 60, and 70, it is possible to correspond to the aberration reduction or more obtained from the conventional convex lens and concave lens doublet structure, and constitute a lens group with a reduced total length. For example, in the optical hybrid lenses 10, 20, 30, 50, 60, and 70, the metalenses 15, 25, 35, 55, 65, and 75 have a reverse dispersion characteristic to the refractive lenses 11, 21, 31, 51, 61, and 71 so that it is possible to constitute a lens group having reduced total length and aberration by replacing the concave lens in the conventional doublet of the convex lens and the concave lens.

In the optical hybrid lenses 10, 20, 30, 50, 60, and 70 according to the embodiment, since the metalenses 15, 25, 35, 55, 65, and 75 are formed to match the curvatures of the curved lens surfaces 13, 23, 33, 53, 63, and 73 of the refractive lenses 11, 21, 31, 51, 61, and 71, unlike the case formed on a plane, the incident angle of light passing through the refractive lens and entering the metalens can be adjusted so that it can be easily utilized for imaging quality.

When the lens assembly is configured by applying the optical hybrid lenses 10, 20, 30, 50, 60, and 70, aberrations such as geometric and chromatic aberration can be reduced, and the total length of the lens module can be reduced, so that it is possible to achieve miniaturization of an imaging device including such a lens assembly, and to obtain a wider field of view.

FIGS. 5A to 5G show an example process of manufacturing an optical hybrid lens according to an embodiment. FIGS. 5A to 5G illustrate a case in which the optical hybrid lens 150 formed through the manufacturing process has the shape of the optical hybrid lens 10 shown in FIG. 1, and this is shown as an example and the embodiment is not limited thereto. The manufacturing process of the optical hybrid lens may be applied to the process of manufacturing an optical hybrid lenses 20, 30, 50, 60, and 70 of the shape shown in FIGS. 2 to 4 or an optical hybrid lens according to an embodiment of another shape by changing the first engraved structure of the first mold and the second engraved structure of the second mold.

Figure 5A:
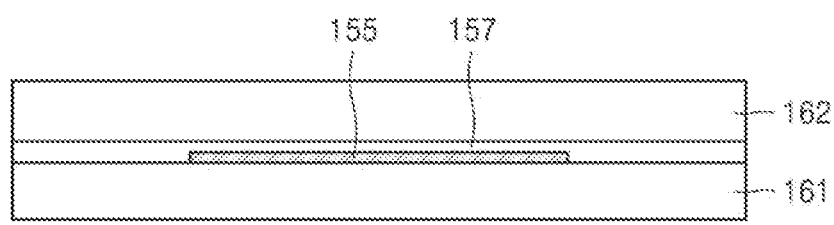
FIGS. 5A to 5G show an example of a process of manufacturing an optical hybrid lens according to an embodiment.

Referring to FIG. 5A, the metalens 155 may be formed on the substrate 161. The substrate 161 may be a device substrate. For example, the metalens 15 may be formed on a device substrate through a semiconductor fine processing or the like. An adhesive layer 157 is formed by applying an adhesive on the metalens 155 formed on the substrate 161 to form a stacked structure of the metalens 155 and the adhesive layer 157. The metalens 155 and the adhesive layer 157 may correspond to the metalens 15 and the adhesive layer 17 described above with reference to FIG. 1. The adhesive layer 157 may temporarily adhere to a carrier substrate 162. The process of temporarily bonding the adhesive layer 157 to the carrier substrate 162 may be omitted.

Figure 5B:
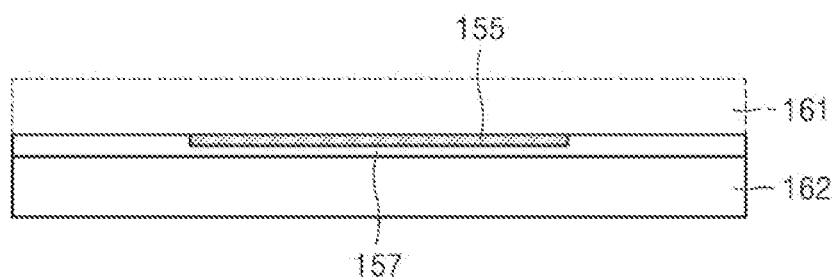

Referring to FIG. 5B, next, the substrate 161 may be removed from at least a partial area to secure a space for forming the optical hybrid lens 150. For example, the process of removing the substrate 161 may be performed in a state in which the adhesive layer 157 formed on the metalens 155 is temporarily adhered to the carrier substrate 162. In this case, the substrate 161 may be removed through a wafer processing process. For example, the substrate 161 may be a device substrate, and a partial area of the substrate 161 may be removed to secure a space for forming the optical hybrid lens 150. In FIG. 5B, it is shown that the entire substrate 161 is removed and this is because only a portion corresponding to a partial area of the substrate 161 is illustrated to show the manufacturing process of the optical hybrid lens, and the substrate 161 may be present in a portion not shown.

Here, the substrate 161 may be removed using a processing process such as grinding, dry polishing, chemical mechanical polishing (CMP), reactive ion etching, and wet etching. In the case of temporarily bonding the adhesive layer 157 to the carrier substrate 162 before the process of removing the substrate 161, the removal process of the substrate 161 may be performed in a state in which the carrier substrate 162 is turned over to be positioned below the substrate 161.

Figure 5C:
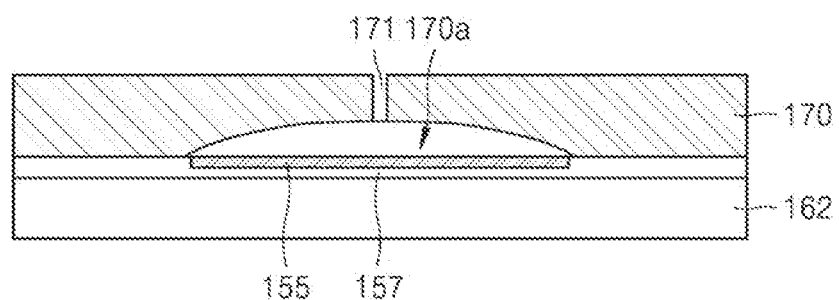

Referring to FIG. 5C, by arranging the first mold 170 at the position where the substrate 161 is removed, the stacked structure of the metalens 155 and the adhesive layer 157 may be fixed to the first mold 170. The first mold 170 may have a first engraved structure 170a corresponding to the curved lens surface 153 of the refractive lens 151. The first engraved structure 170a of the first mold 170 facing the metalens 15 may correspond to a spherical or aspherical shape of the curved lens surface 153 of the refractive lens 151 to be manufactured. That is, the first mold 170 may be formed so that the first engraved structure 170a of the portion corresponding to the metalens 155 has a curvature corresponding to the curved lens surface 153 of the refractive lens 151. In addition, in order to induce a vacuum so that the metalens 15 and the adhesive layer 17 can be in close contact with the surface of the first engraved structure 170a of the first mold 170, an air outlet 171 connected to a vacuum pump may be formed in the first mold 170.

Figure 5D:
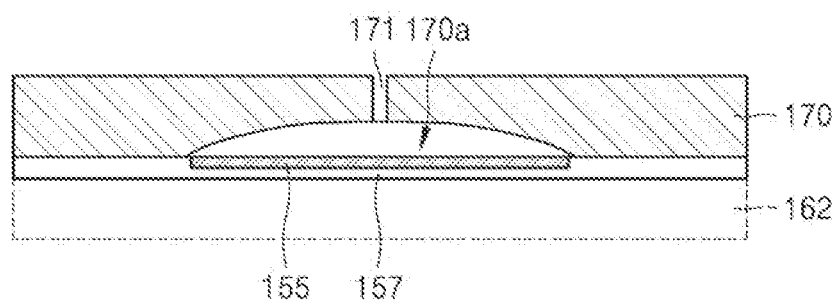

Thereafter, referring to FIG. 5D, in a state in which the stacked structure of the metalens 155 and the adhesive layer 157 is fixed to the first mold 170, the carrier substrate 162 may be removed by separating the interface between the carrier substrate 162 and the adhesive layer 157. In order to separate the carrier substrate 162 from the interface of the adhesive layer 157, a laser, heat, an organic solvent, or the like may be used. When the process of temporarily bonding the adhesive layer 157 to the carrier substrate 162 is omitted, the process of FIG. 5D may be omitted.

Figure 5E:
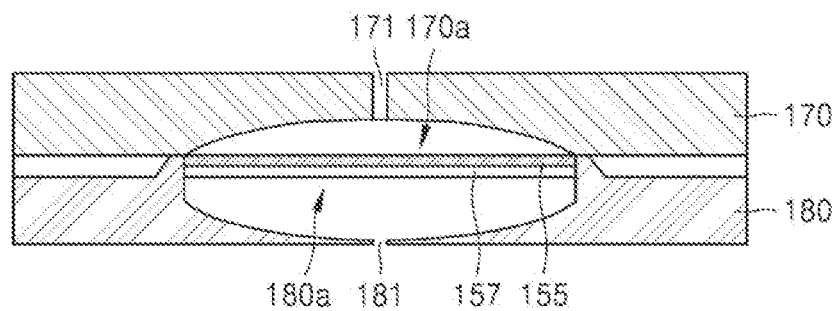

Next, referring to FIG. 5E, the second mold 180 may be combined with the first mold 170. The second mold 180 and the first mold 170 may be bonded and fastened to each other. A second engraved structure 180a corresponding to the counter lens surface 152 of the refractive lens 151 may be formed on the second mold 180. In addition, an injection port 181 for injection molding of the refractive lens 151 may be formed in the second mold 180. The first mold 170 and the second mold 180 may be combined such that the first engraved structure 170a and the second engraved structure 180a face each other with the stacked structure of the metalens 155 and the adhesive layer 157 therebetween.

Figure 5F:
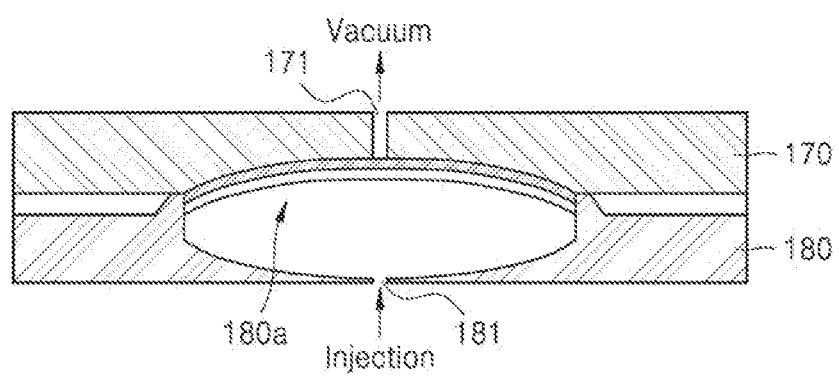

Next, as illustrated in FIG. 5F, the stacked structure of the metalens 155 and the adhesive layer 157 may be in close contact with the surface of the first engraved structure 170a of the first mold 170, and an injection material for forming the refractive lens 151 may be injected into the second mold 180. The process of allowing the stacked structure of the metalens 155 and the adhesive layer 157 into close contact with the surface of the first engraved structure 170a of the first mold 170 may be performed by inducing a vacuum between the first engraved structure 170a of the first mold 170 and the stacked structure of the metalens 155 and the adhesive layer 157. Vacuum induction may be performed through, for example, the air outlet 171 formed in the first mold 170. The injecting of an injection material for forming the refractive lens 151 may be performed, for example, through the injection port 181 formed in the second mold 180. The injection material may be a high-temperature polymer material. That is, in order to form the refractive lens 151, a high-temperature polymer material may be injected through the injection port 181 formed in the second mold 180.

Figure 5G:
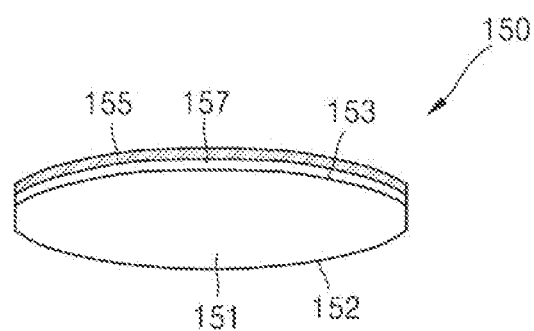

Next, referring to FIG. 5G, after firing the injected injection material, for example, a high-temperature polymer material, the first mold 170 and the second mold 180 may be removed, so that an optical hybrid lens 150 having a laminated structure of an adhesive layer 157 and a metalens 155 on the curved lens surface 153 of the refractive lens 151 may be obtained.

The optical hybrid lens 150 according to various embodiments may be manufactured through the manufacturing process of FIGS. 5A to 5G. When the first engraved structure 170a of the first mold 170 is changed according to the shape of the curved lens surface 153 of the refractive lens 151, and the second engraved structure 180a of the second mold 180 is changed according to the shape of the counter lens surface 152 of the refractive lens 151, optical hybrid lenses of various shapes as described with reference to FIGS. 1 to 4 may be manufactured.

Figure 6A:
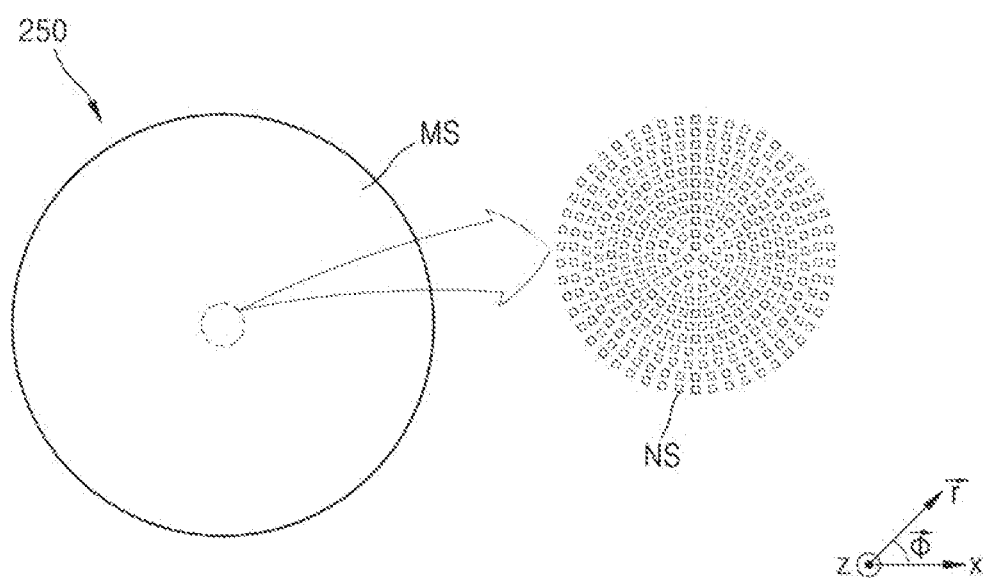
FIG. 6A is a plan view showing an example of a metasurface of a metalens of an optical hybrid lens according to an embodiment.
Figure 6B:
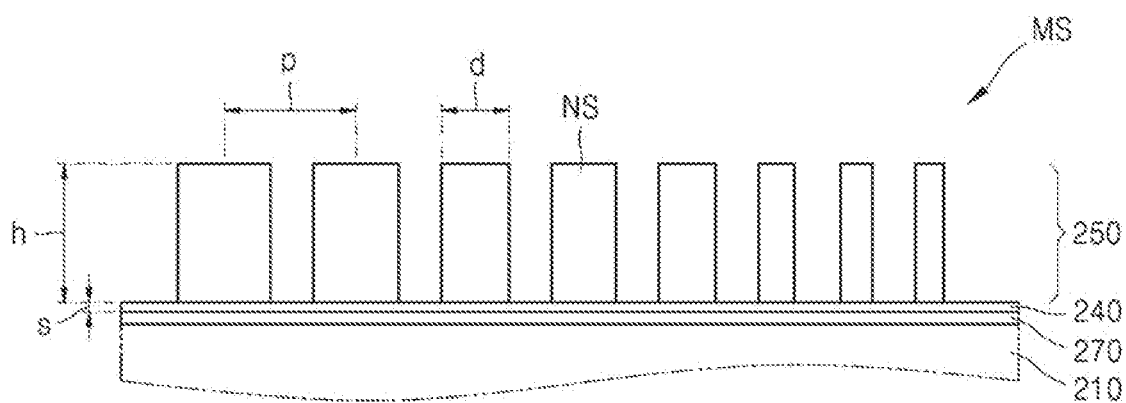
FIGS. 6B to 6D are cross-sectional views of a partial area of various metalenses of an optical hybrid lens according to an embodiment.
Figure 6C:
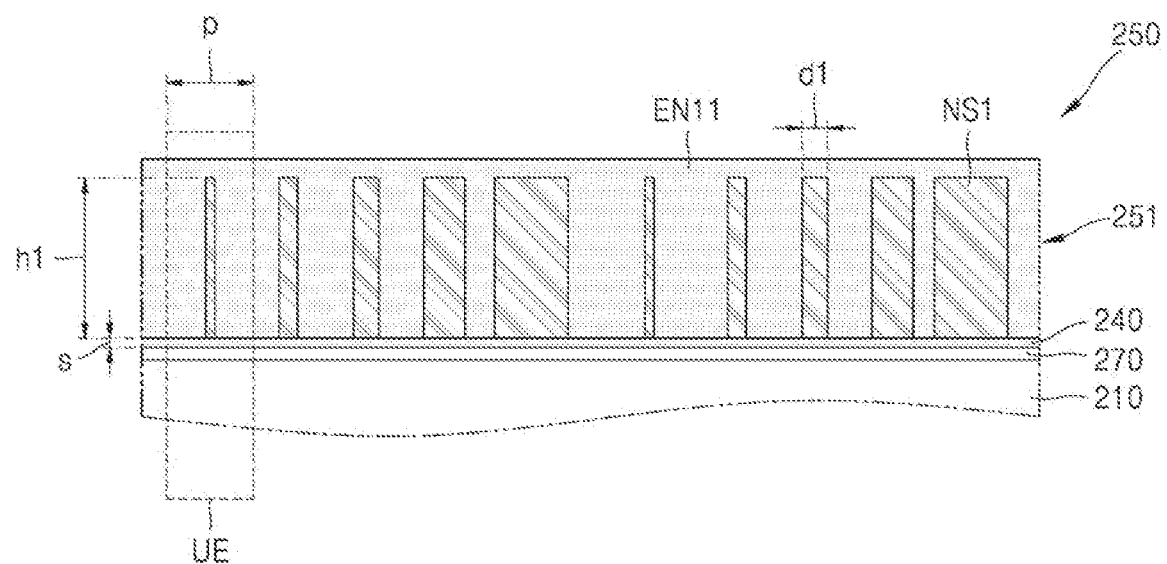
Figure 6D:
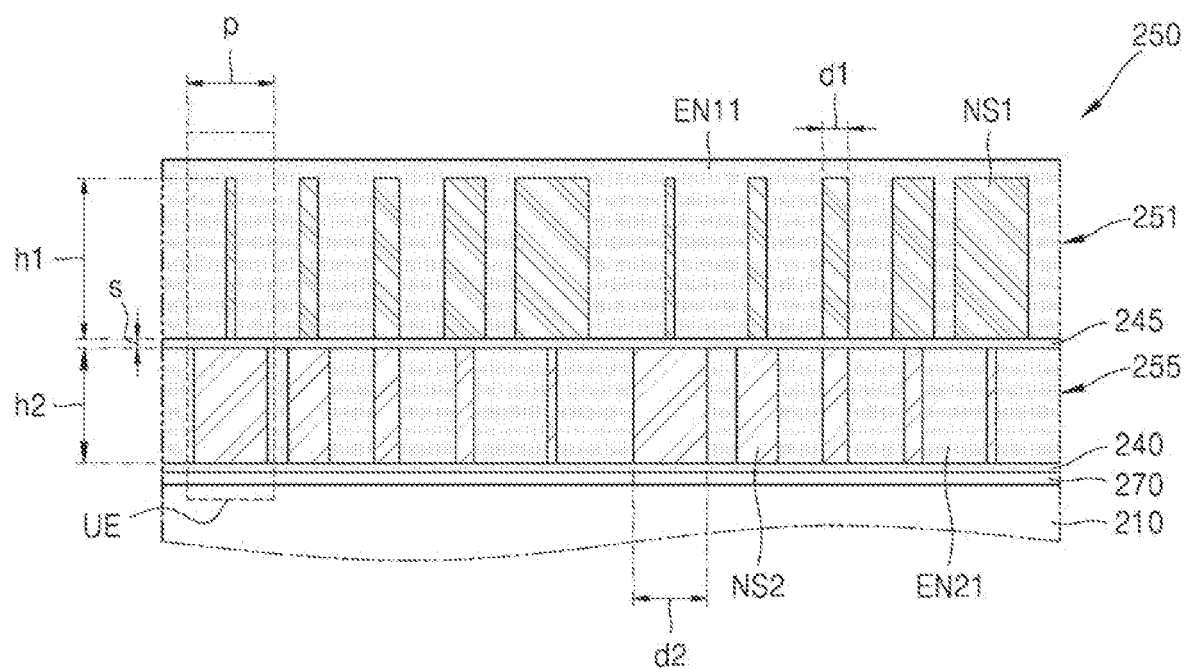

FIG. 6A is a plan view showing an example metasurface MS of a metalens of an optical hybrid lens according to an embodiment, and FIGS. 6B to 6D are cross-sectional views of a partial area of various metalenses of an optical hybrid lens according to an embodiment. In FIGS. 6A to 6D, reference numerals 210, 250, and 270 denote a refractive lens, a metalens, and an adhesive layer constituting the optical hybrid lens, respectively.

The metalens 250 described below may be applied to an optical hybrid lens according to various embodiments described with reference to FIGS. 1 to 4 and 5G.

Referring to FIG. 6A, the metalens 250 includes at least one metasurface MS including a plurality of nanostructures NS having a shape dimension of a sub-wavelength of incident light.

Referring to FIGS. 6B to 6D, the metalens 250 may include at least one metasurface MS to have a desired refractive power while reducing chromatic aberration or geometric aberration. The metasurface MS includes a plurality of nanostructures NS having a shape dimension of a sub-wavelength so as to implement a predetermined transmission phase distribution by modulating the phase of incident light according to a position. The sub-wavelength refers to a wavelength smaller than the center wavelength $\lambda_o$ of the operating wavelength band of the metalens 250. The operating wavelength band may be a visible light band in the range of about 400 nm to about 700 nm, but is not limited thereto.

The plurality of nanostructures NS may be arranged along a plurality of ring shapes. The shape and size of the nanostructure NS for each location may be defined as a function of the distance r from the center of the metasurface MS, and may have a polar symmetric distribution. However, this is an example and is not limited thereto.

The metasurface MS may be composed of a high refractive index pillar and a low refractive index surrounding material, or a low refractive index pillar and a high refractive index surrounding material, and when the metalens 250 includes a plurality of metasurfaces forming a stacked structure, a dielectric layer 240 may be further provided between the metasurfaces. The dielectric layer 240 may also be provided between the metalens 250 and the adhesive layer 270. For example, the metalens 250 has at least one metasurface, and a dielectric layer 240 is provided on the surface of the metasurface facing the adhesive layer 270 positioned on the side of the adhesive layer 270 so that the dielectric layer 240 may also be provided between the metalens 250 and the adhesive layer 270. The dielectric layer 240 may serve as a spacer layer.

FIG. 6B shows an example in which the metasurface MS includes a plurality of nanostructures NS having a shape dimension of a sub-wavelength.

The arrangement pitch p of the plurality of nanostructures NS, that is, the distance between the centers of adjacent nanostructures NS, and the width d and height h of the nanostructures NS may be different from each other in the plurality of nanostructures NS. The shape, size, and arrangement period for each position of the nanostructure NS may be determined according to a phase delay function to be implemented by the metasurface MS. The transmission phase distribution of light passing through the metasurface MS is determined according to the phase delay function, and the metalens 250 exhibits a predetermined optical function according to the transmission phase distribution. In other words, the shape, size, and arrangement period for each location of the nanostructure NS may be set according to an optical function to be implemented by the metasurface MS.

The arrangement pitch p and width d of the nanostructures NS may be dimensions of sub-wavelengths. That is, d and p may be smaller than the center wavelength $\lambda_0$ of the operating wavelength band of the metalens 250. The height h of the nanostructure NS may be greater than $\lambda_0$. The height h may be greater than $\lambda_0$ and less than $10\lambda_0$.

FIG. 6B shows an example in which the dielectric layer 240 is further provided on the surface of the metasurface facing the adhesive layer 270 of the metasurface MS constituting the metalens 250. The thickness s of the dielectric layer 240 may be, for example, a value within or less than the range of the operating wavelength band of the metalens 250. The dielectric layer 240 may have a refractive index lower than that of the nanostructure NS. The dielectric layer 240 may be omitted. That is, the thickness s of the dielectric layer 240 may be 0. The dielectric layer 240 may serve as a spacer layer.

Figure 7A:
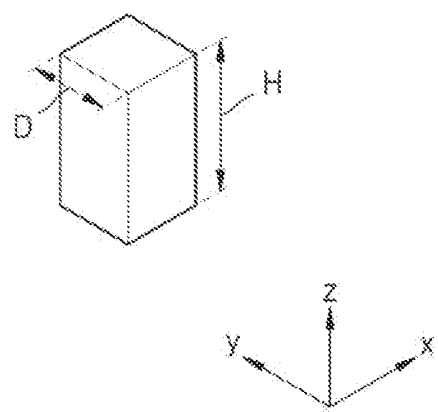
FIGS. 7A, 7B, 8A, and 8B are perspective views showing examples of shapes of nanostructures that can be employed in the metalens according to embodiments.
Figure 7B:
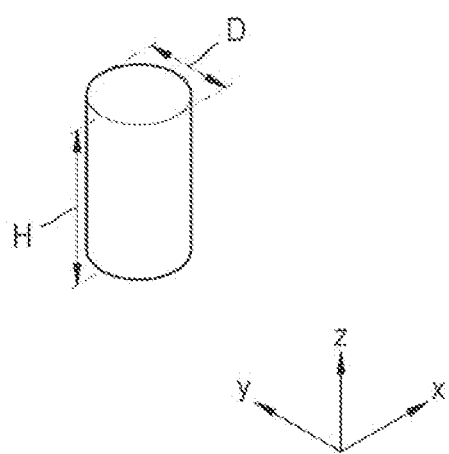

In the embodiment of FIG. 6B, the nanostructure NS may be a columnar structure. For example, the nanostructure NS may have a square column shape as shown in FIG. 7A or a cylindrical shape as shown in FIG. 7B. The indicated width D corresponds to d, and the height H corresponds to h. In addition, various pillar shapes having a cross-sectional shape of a rectangle, cross, polygon, or ellipse may be applied to the nanostructure NS.

FIG. 6C illustrates an example in which a metalens 250 includes a metasurface constituting the first layer 251, and the metasurface constituting the first layer 251 includes a plurality of first nanostructures NS1 and a first surrounding material EN11 surrounding the first nanostructures NS1.

The plurality of first nanostructures NS1 may have a high refractive index, and the first surrounding material EN11 surrounding the first nanostructures NS1 may have a low refractive index. In addition, the plurality of first nanostructures NS1 may have a low refractive index, and the first surrounding material EN11 surrounding the first nanostructures NS1 may have a high refractive index.

The first nanostructures NS1 may have a width d1 and a height h1 determined according to a location. As shown in the drawing, the height h1 of the first nanostructures NS1 may all be the same, but is not limited thereto. The first nanostructures NS1 may have an aspect ratio greater than 1 to avoid light resonance inside the structure. That is, h1/d1 may be greater than 1, for example, may be greater than 2.

The arrangement pitch p and width d1 of the nanostructures NS may be dimensions of sub-wavelengths. That is, d1 and p may be smaller than the center wavelength $\lambda_0$ of the operating wavelength band of the metalens 250. The height h1 of the first nanostructures NS1 may be greater than $\lambda_0$. The height h1 may be greater than $\lambda_0$ and less than $10\lambda_0$.

In FIG. 6C, it is shown that the plurality of first nanostructures NS1 are buried by the first surrounding material EN11, but the embodiment is not limited thereto. For example, the first surrounding material EN11 may be formed so that the upper ends of the plurality of first nanostructures NS1 are exposed. In this case, the layer thickness of the first surrounding material EN11 may be equal to or smaller than the height h1 of the plurality of first nanostructures NS1.

Meanwhile, FIG. 6C shows an example in which the dielectric layer 240 is further provided on a surface of the metasurface facing the adhesive layer 270 constituting the metalens 250. The dielectric layer 240 may have a single layer or multiple layer structure. The thickness s of the dielectric layer 240 may be, for example, a value within or less than the range of the operating wavelength band of the metalens 250. When the plurality of first nanostructures NS1 have a high refractive index, the dielectric layer 240 may have a lower refractive index than the first nanostructure NS1. As another example, when the plurality of first nanostructures NS1 has a low refractive index, the dielectric layer 240 may have a higher refractive index than the first nanostructures NS1. The dielectric layer 240 may be, for example, the same material as the first surrounding material EN11. When the dielectric layer 240 has a multi-layer structure, at least one layer of the dielectric layer 240 may be, for example, the same material as the first surrounding material EN11. The dielectric layer 240 may be omitted. That is, the thickness s of the dielectric layer 240 may be 0. The dielectric layer 240 may serve as a spacer layer.

In an embodiment, the first nanostructures NS1 may be columnar structures. For example, the nanostructures NS1 may have a square column shape as shown in FIG. 7A or a cylindrical shape as shown in FIG. 7B. The indicated width D corresponds to d1, and the height H corresponds to h1. In addition, various pillar shapes having a cross-sectional shape of a rectangle, cross, polygon, or ellipse may be applied to the first nanostructures NS1.

Figure 8A:
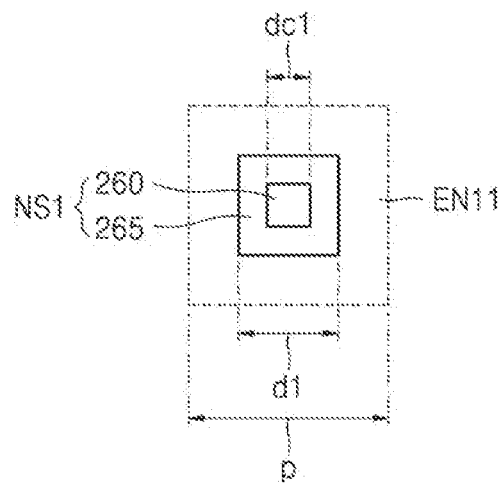
Figure 8B:
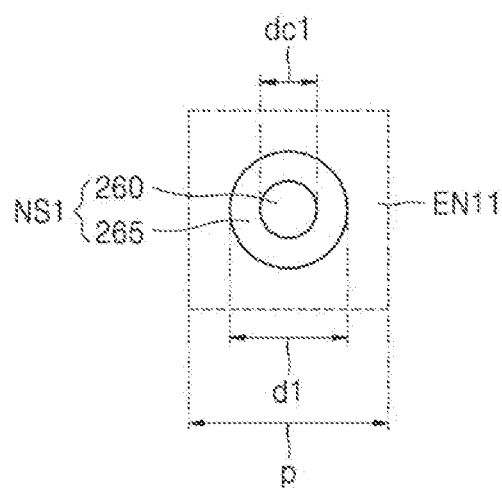

Further, in an embodiment, as shown in FIGS. 8A and 8B, the first nanostructures NS1 may have a shape including an inner pillar 260 having a width of dc1 and a shell pillar 265 surrounding the inner pillar 260. The refractive index of the inner pillar 260 may be lower than that of the shell pillar 265.

FIG. 6D shows an embodiment in which the metalens 250 has two layers of metasurfaces and a dielectric layer 245 between the metasurfaces.

Referring to FIG. 6D, compared to FIG. 6C, in addition to the metasurface constituting the first layer 251, the metalens 250 may further include a metasurface constituting the second layer 255 to include two metasurfaces constituting a stacked structure. That is, the metalens 250 may include a first layer 251 and a second layer 255. Here, the metalens 250 may be provided to include two or more metasurfaces.

The first layer 251 includes a plurality of first nanostructures NS1 and a first surrounding material EN11 surrounding the first nanostructures NS1. The first nanostructures NS1 may have a width d1 and a height h1 determined according to a location. As shown in the drawing, the height h1 of the first nanostructures NS1 may all be the same, but is not limited thereto.

The second layer 255 includes a plurality of second nanostructures NS2 and a second surrounding material EN21 surrounding the second nanostructures NS2. The second nanostructures NS2 may have a width d2 and a height h2 determined according to a location. As shown in the drawing, the height h2 of the second nanostructures NS2 may be the same, but is not limited thereto.

The plurality of first nanostructures NS1 and the first surrounding material EN11 surrounding the first nanostructures NS1 may have different refractive indices, and the plurality of second nanostructures NS2 and the second surrounding material EN21 surrounding the second nanostructures NS2 may have different refractive indices. That is, the plurality of first nanostructures NS1 and the plurality of second nanostructures NS2 may have a high refractive index, and the first surrounding material EN11 and the second surrounding material EN21, which surround the first nanostructures NS1 and the second nanostructures NS2, may have a low refractive index. In addition, the plurality of first nanostructures NS1 and the plurality of second nanostructures NS2 may have a low refractive index, and the first surrounding material EN11 and the second surrounding material EN21, which surround the first nanostructures NS1 and the second nanostructures NS2, may have a high refractive index. In addition, the plurality of first nanostructures NS1 may have a low refractive index, and the first surrounding material EN11 surrounding the first nanostructures NS1 may have a high refractive index, and the plurality of second nanostructures NS2 may have a high refractive index, and the second surrounding material EN21 surrounding the second nanostructures NS2 may have a low refractive index. In addition, the plurality of first nanostructures NS1 may have a high refractive index, and the first surrounding material EN11 surrounding the first nanostructures NS1 may have a low refractive index, and the plurality of second nanostructures NS2 may have a low refractive index, and the second surrounding material EN21 surrounding the second nanostructures NS2 may have a high refractive index.

The first nanostructures NS1 and the second nanostructures NS2 may have an aspect ratio greater than 1 to avoid optical resonance inside the structure. That is, h1/d1 and h2/d2 may be greater than 1, for example, may be greater than 2.

The first nanostructures NS1 and the second nanostructures NS2 at positions facing each other may form a repeating unit component UE. Detailed shapes included in the unit component UE, that is, the width d1, height h1 of the first nanostructures NS1, the width d2, height h2 of the second nanostructures NS2, and the arrangement period p of the unit component UE may be set appropriately to a phase delay value required at each position.

d1, d2, and p may be dimensions of sub-wavelengths. That is, d1, d2, and p may be smaller than the center wavelength $\lambda_0$ of the operating wavelength band of the metalens 250. h1 and h2 may be greater than $\lambda_0$. h1 and h2 may be greater than $\lambda_0$ and less than $10\lambda_0$.

In FIG. 6D, it is shown that the plurality of first nanostructures NS1 are buried by the first surrounding material EN11, but the embodiment is not limited thereto. For example, the first surrounding material EN11 may be formed so that the upper ends of the plurality of first nanostructures NS1 are exposed. In this case, the layer thickness of the first peripheral material EN11 may be equal to or smaller than the height h1 of the plurality of first nanostructures NS1.

Moreover, a dielectric layer 245 may be disposed between the first layer 251 and the second layer 255. The dielectric layer 245 may have a single layer or multiple layer structure. The thickness s of the dielectric layer 245 may be, for example, a value within or less than the range of the operating wavelength band of the metalens 250. When the plurality of first nanostructures NS1 or the plurality of second nanostructures NS2 have a high refractive index, the dielectric layer 245 may have a refractive index lower than that of the first nanostructures NS1 or the second nanostructures NS2. When the plurality of first nanostructures NS1 or the plurality of second nanostructures NS2 have a low refractive index, the dielectric layer 245 may have a refractive index higher than that of the first nanostructures NS1 or the second nanostructures NS2. The dielectric layer 245 may be, for example, the same material as the first surrounding material EN11 or the second surrounding material EN21. When the dielectric layer 245 has a multilayer structure, at least one layer of the dielectric layer 245 may be, for example, the same material as the first surrounding material EN11 or the second surrounding material EN21. The dielectric layer 245 may be omitted. That is, the thickness s of the dielectric layer 245 may be 0. The dielectric layer 245 may serve as a spacer layer.

Furthermore, even when the metalens 250 includes a metasurface constituting the first layer 251 and a metasurface constituting the second layer 255 as shown in FIG. 6D, a dielectric layer 240 may be further provided on a surface facing the adhesive layer 270 on the metasurface forming the second layer 255. In this case, the dielectric layer 240 may have a single layer or multiple layer structure. In this embodiment, the dielectric layer 240 may be, for example, the same material as the second surrounding material EN21. When the dielectric layer 240 has a multi-layer structure, at least one layer of the dielectric layer 240 may be, for example, the same material as the second surrounding material EN21. Herein, the dielectric layer 240 may be omitted. That is, the thickness s of the dielectric layer 240 may be 0. The dielectric layer 240 may serve as a spacer layer.

The first nanostructures NS1 and the second nanostructures NS2 may be pillar-shaped structures. For example, the first nanostructures NS1 and the second nanostructures NS2 may have a square column shape as shown in FIG. 7A or a cylindrical shape as shown in FIG. 7B. The indicated width D corresponds to d1 or d2, and the height H corresponds to h1 or h2. In addition, various pillar shapes having a cross-sectional shape of a rectangle, cross, polygon, or ellipse may be applied to the first nanostructures NS1 and the second nanostructures NS2.

In an embodiment, the first nanostructures NS1 may have a higher refractive index than the first surrounding material EN11, and the second nanostructures NS2 may have a higher refractive index than the second surrounding material EN21. In this refractive index arrangement, the changing tendency of the widths d1 and d2 of the first nanostructures NS1 and the second nanostructures NS2 may be set opposite to each other in a direction away from the center of the metalens 250. Accordingly, the first layer 251 and the second layer 255 have opposite signs of an effective refractive index change rate according to a position. In addition, in relation to the first layer 251 and the second layer 255, materials, shape dimensions, and the like included in the unit component UE may be set according to positions so that the ratio of the dispersion change rate to the effective refractive index change is different.

Any one of the first layer 251 and the second layer 255 may be a phase delay layer having an effective refractive index change rate according to a position representing a phase profile of the same tendency as the target phase profile to be implemented by the metalens 250, that is, of the same tendency as the target phase profile, and the other layer may be a dispersion adjusting layer indicating an effective refractive index change rate opposite to the target phase profile. The dispersion adjusting layer may be set to have the change tendency of the material and the width such that the ratio of the dispersion change rate to the effective refractive index change is greater than that of the phase delay layer.

As another example, modification is possible so that the first nanostructures NS1 may have a lower refractive index than the first surrounding material EN11, and the second nanostructures NS2 may have a lower refractive index than the second surrounding material EN21.

In addition, the first nanostructures NS1 may have a lower refractive index than the first surrounding material EN11 and the second nanostructures NS2 may have a higher refractive index than the second surrounding material EN22. In this refractive index arrangement, the changing tendency of the widths d1 and d2 of the first nanostructures NS1 and the second nanostructures NS2 in a direction may be set equal to each other in the direction away from the center of the metalens 250. Accordingly, the first layer 251 and the second layer 255 may have opposite signs of an effective refractive index change rate according to a position. In addition, in relation to the first layer 251 and the second layer 255, materials included in each layer and a degree of a change tendency of the width in each layer may be set so that the ratio of the dispersion change rate to the effective refractive index change is different from each other.

As another example, modification is possible so that the first nanostructures NS1 may have a higher refractive index than the first surrounding material EN11, and the second nanostructures NS2 may have a lower refractive index than the second surrounding material EN21.

In this embodiment, as shown in FIGS. 8A and 8B, the first nanostructures NS1 may have a shape including an inner pillar 260 having a width of dc1 and a shell pillar 265 surrounding the inner pillar 260, and the second nanostructures NS2 may be a columnar structure. The second nanostructures NS2 may have a square column shape as illustrated in FIG. 7A or a cylindrical shape as illustrated in FIG. 7B. The indicated width D corresponds to d2, and the height H corresponds to h2. In addition, various pillar shapes having a cross-sectional shape of a rectangle, cross, polygon, or ellipse may be applied to the second nanostructures NS2.

The refractive index of the inner pillar 260 may be lower than the refractive index of the shell pillar 265, and the refractive index of the shell pillar 265 may be higher than the refractive index of the first surrounding material EN11. The second nanostructures NS2 may have a higher refractive index than the second surrounding material EN21.

In this refractive index arrangement, the changing tendency of the widths of the first nanostructures NS1 and the second nanostructures NS2 in a direction may be set opposite to each other in the direction away from the center of the metalens 250. Accordingly, the first layer 251 and the second layer 255 have opposite signs of an effective refractive index change rate according to a position. In addition, in relation to the first layer 251 and the second layer 255, details of the unit component UE may be set so that the ratio of the dispersion change rate to the effective refractive index change is different.

Even in this case, any one of the first layer 251 and the second layer 255 may be a phase delay layer indicating a phase profile of the same tendency as the target phase profile to be implemented by the metalens 250, and the other layer may be a dispersion adjusting layer.

On the other hand, when the first nanostructures NS1 provided in the first layer 251 are in a form that the inside of the shell pillar 265 of high refractive index is filled with the inner pillar 260 of low refractive index, a phenomenon in which the effective refractive index rapidly increases as the width d1 of the first nanostructures NS1 increases may be alleviated, and it is advantageous to minimize the dispersion change depending on the location. In this respect, the first layer 251 is advantageous in being used as a phase delay layer representing a phase profile having the same tendency as the target phase profile to be implemented by the metalens 250. The second layer 255 as a dispersion adjusting layer may be set in detail to include a material and a change tendency of a width so that the ratio of the dispersion change rate to the effective refractive index change rate is larger as compared to the first layer 251.

FIG. 6D shows that the metasurface of the first layer 251 and the metasurface of the second layer 255 of the metalens 250 have a plurality of first nanostructures NS1 and a plurality of second nanostructures NS2 having different arrangements, dimensions, and the like, and this is illustrative and the embodiment is not limited thereto. The plurality of first nanostructures NS1 and the plurality of second nanostructures NS2 of the metasurface of the first layer 251 and the metasurface of the second layer 255 may have different arrangements or the same arrangement, or may have different dimensions or the same dimensions.

Figure 9:
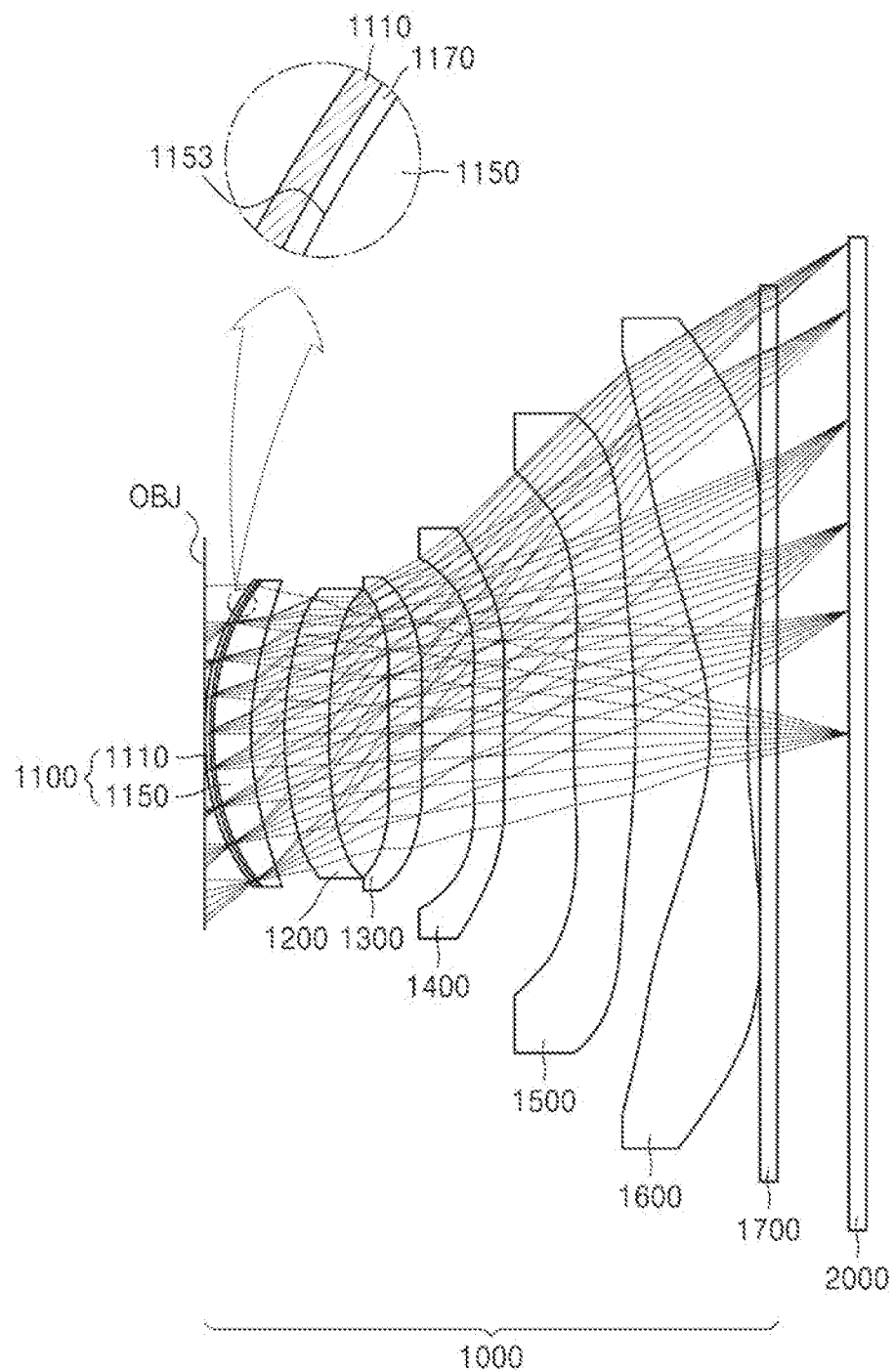
FIG. 9 is a cross-sectional view of a lens assembly including an optical hybrid lens according to an embodiment and an imaging device using the same as an imaging lens.

FIG. 9 illustrates a lens assembly 1000 including an optical hybrid lens 1100 according to an embodiment and an imaging device using the same as an imaging lens.

Referring to FIG. 9, the imaging device may include a lens assembly 1000 constituting an imaging lens and an image sensor 2000 that converts an optical image of an object OBJ formed by the lens assembly 1000 into an electrical image signal. An infrared cut-off filter 1700 may be further provided between the lens assembly 1000 and the image sensor 2000. The infrared cut-off filter 1700 may be part of the lens assembly 1000 or may be separate from the lens assembly 1000. The lens assembly 1000 may include an optical hybrid lens 1100 and at least one lens (i.e., at least one other refractive lens).

The image sensor 2000 may be disposed at a position on an image plane where the optical image of the object OBJ is formed by the lens assembly 1000. For, example, the image sensor 2000 may include a Complementary Metal-Oxide Semiconductor (CMOS) image sensor, a Charge Coupled Device (CCD), and the like, which sense an object image and generate an electrical image signal. The image sensor 2000 may also include an array of photodiodes. The image sensor 2000 may acquire an object image by detecting contrast information, gradation ratio information, color information, and the like for an object from light passing through the lens assembly 1000.

The lens assembly 1000 may include, for example, an optical hybrid lens 1100 and a plurality of lenses (i.e., a plurality of other lenses).

In the lens assembly 1000, the plurality of lenses may include, for example, first to fifth lenses 1200, 1300, 1400, 1500, and 1600, and the first to fifth lenses 1200, 1300, 1400, 1500, and 1600 may be refractive lenses. For example, the lens assembly 1000 may include an optical hybrid lens 1100 and five refractive lenses. The number of refractive lenses included in the lens assembly 1000 may vary according to design conditions. In FIG. 9, a case where the lens assembly 1000 includes an optical hybrid lens 1100 and five refractive lenses is illustrated as an example, and the number of lenses may vary depending on the design conditions of the imaging device.

In the lens assembly 1000, the optical hybrid lens 1100 may be disposed on the front part of the imaging device. In this way, when the optical hybrid lens 1100 is disposed on the front part of the imaging device, a concave lens for correcting chromatic aberration may be unnecessary. The optical hybrid lens 1100 may include a metalens 1110 and a refractive lens 1150 like the optical hybrid lens according to an embodiment described with reference to FIGS. 1 to 4, and the metalens 1110 may have at least one metasurface as described with reference to FIGS. 6A to 6D, and the metalens 1110 and the refractive lens 1150 have a structure in which they are adhered by an adhesive layer 1170, and the metalens 1110 may have a curvature along the curved lens surface 1153 of the refractive lens 1150 that faces the metalens 1110. That is, the optical hybrid lens 1100 may include an optical hybrid lens according to various embodiments described with reference to FIGS. 1 to 4 and 6A to 6D, and the optical hybrid lens 1100 may be manufactured through the manufacturing process described with reference to FIGS. 5A to 5G.

When applied to the imaging device, in the optical hybrid lens 1100 of the lens assembly 1000, both the refractive lens 1150 and the metalens 1110 may be provided to have positive optical power and have opposite chromatic aberration characteristics.

When applying the optical hybrid lens 1100 to the lens assembly 1000, aberration correction is possible without loss of refractive power due to not having a concave lens on the front part of the imaging device, and this can also contribute to the reduction of the total length of the imaging device.

Meanwhile, when applied to an imaging device, in relation to the optical hybrid lens 1100 of the lens assembly 1000, the metalens 1110 may be arranged to be positioned on the front part of the imaging device, that is, the side of the object surface OBJ, and the refractive lens 1150 may be positioned behind the metalens 1110 with respect to the object surface OBJ. FIG. 9 illustrates an example being applied the optical hybrid lens 1100 of an embodiment in which a refractive lens 1150 in the form of a meniscus lens having a convex lens surface as a curved lens surface 1153 is provided on the front part of the imaging device (i.e., on a front side of the refractive lens 1150), that is, the side of the object plane OBJ, and the metalens 1110 is applied to the curved lens surface 1153 of the refractive lens 1150.

Here, FIG. 9 shows a case where the optical hybrid lens 1100 is positioned on the object plane OBJ, and then a plurality of lenses are sequentially arranged, and this is an example, and the arrangement position of the optical hybrid lens 1100 may be changed. For example, in the lens assembly 1000, the optical hybrid lenses 1100 and the first to fifth lenses 1200, 1300, 1400, 1500, and 1600 may be arranged sequentially from the object plane OBJ side to the image plane side. As another example, the lens assembly 1000 may have an arrangement in which at least one lens is positioned from the object plane OBJ side to the image plane side, and subsequently, the optical hybrid lens 1100 according to an embodiment is positioned, and then, at least one other lens is positioned.

Figure 10:
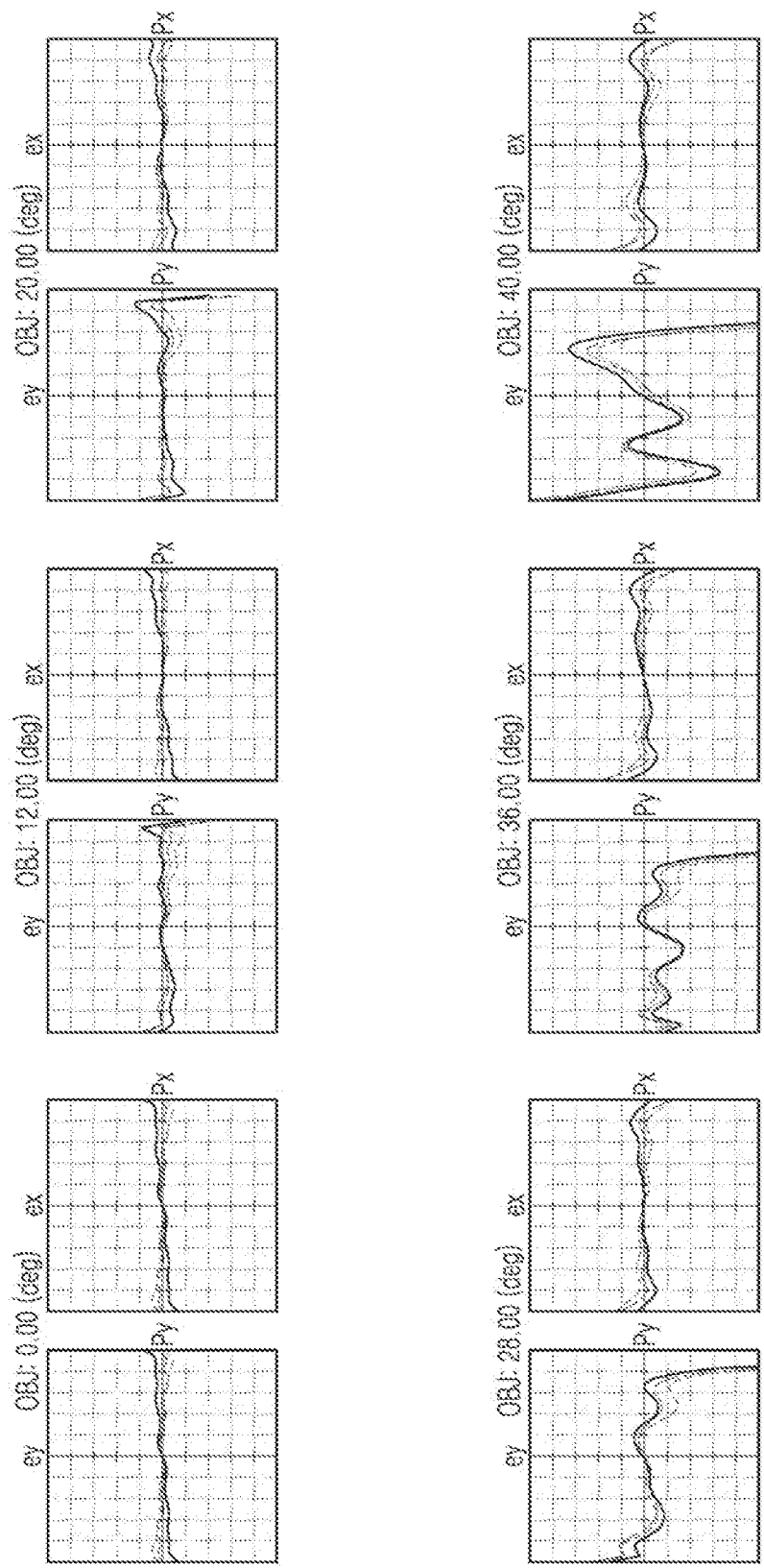
FIGS. 10 and 11 are a ray fan graph and a module transfer function (MTF) graph according to the incident angle of the lens assembly of the imaging device of FIG. 9.
Figure 11:
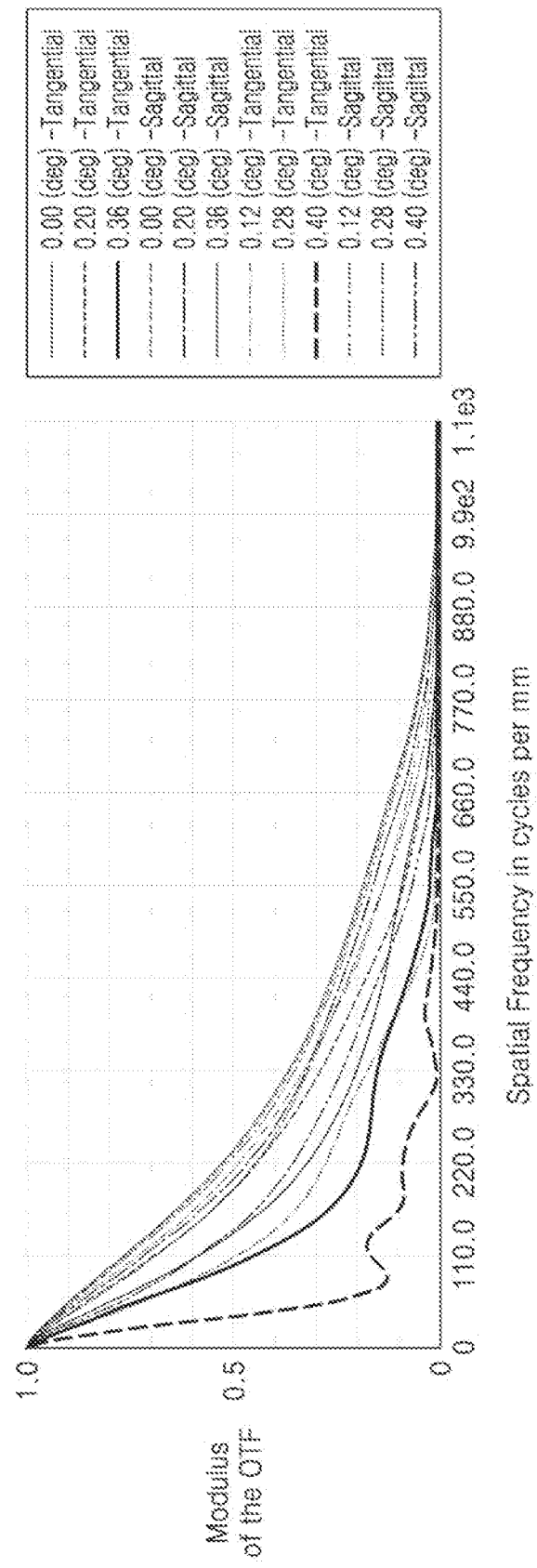

FIGS. 10 and 11 are a ray fan graph and a module transfer function (MTF) graph according to the incident angle of the lens assembly 1000 of the imaging device of FIG. 9.

FIG. 10 shows a ray fan for red light, green light, and blue light when the incident angle of light incident from the object plane OBJ to the lens assembly 1000 is 0.00 degrees, 12.00 degrees, 20.00 degrees, 28.00 degrees, 36.00 degrees and 40.00 degrees, respectively and the aberrations ex and ey in each direction along the x direction Px and the y direction Py. FIG. 11 shows the tangential and sagittal module transfer function (MTF) when the incident angle of light incident from the object plane OBJ to the lens assembly 1000 is 0.00 degrees, 12.00 degrees, 20.00 degrees, 28.00 degrees, 36.00 degrees, and 40.00 degrees, respectively.

As shown in FIGS. 10 and 11, when the optical hybrid lens 1100 including the metalens 1110 is applied, it can be seen that chromatic aberration, for example, lateral chromatic aberration and vertical chromatic aberration, may be well controlled. That is, it can be seen that the lens assembly 1000 to which the optical hybrid lens 1100 according to an embodiment is applied may have very good aberration characteristics.

Figure 12:
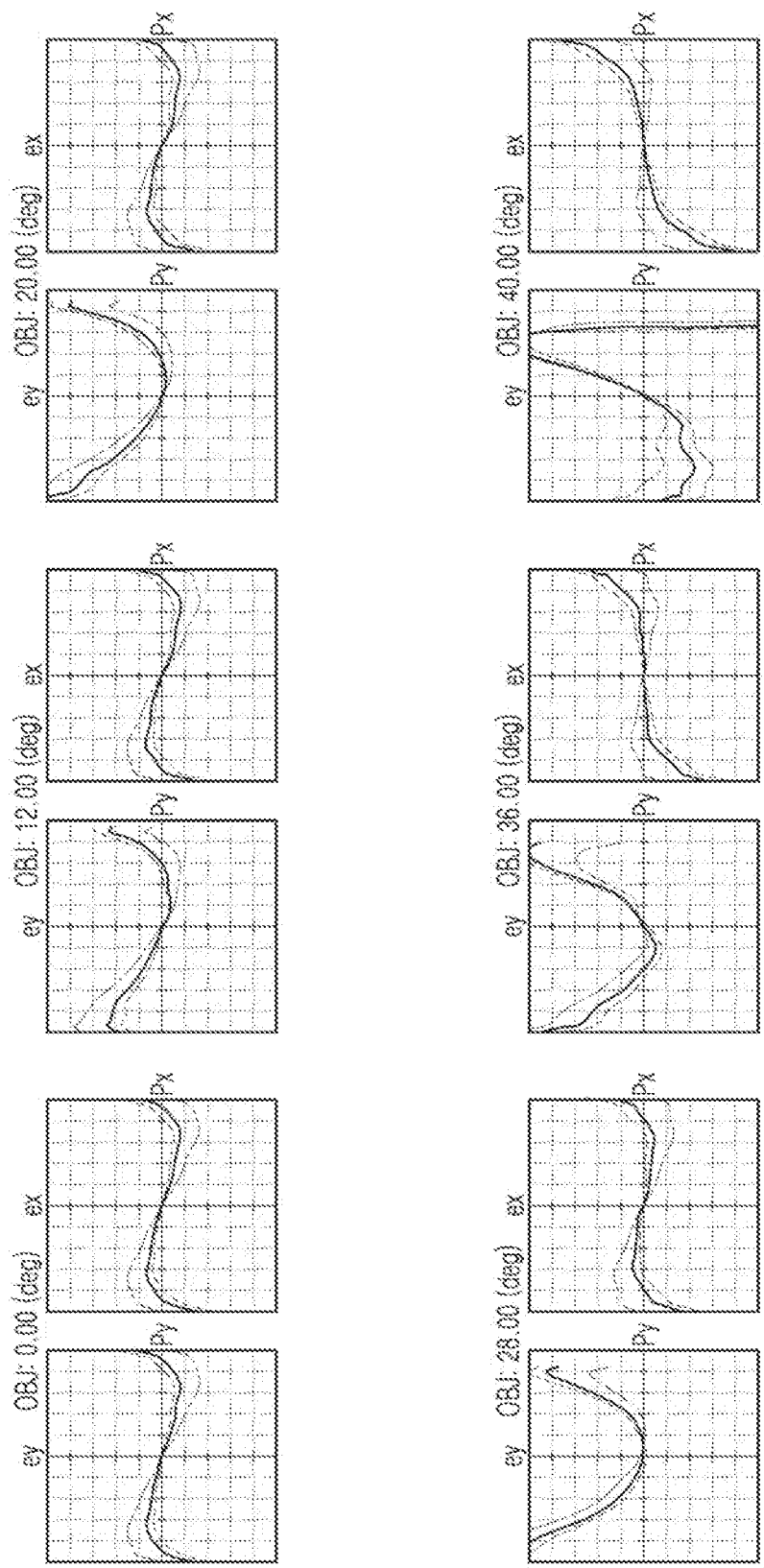
FIGS. 12 and 13 are a ray fan graph and a module transfer function (MTF) graph as comparative examples according to the incident angle obtained when using a refractive lens that does not include the metalens and the adhesive layer at the position of the optical hybrid lens in the lens assembly of the imaging device of FIG. 9.
Figure 13:
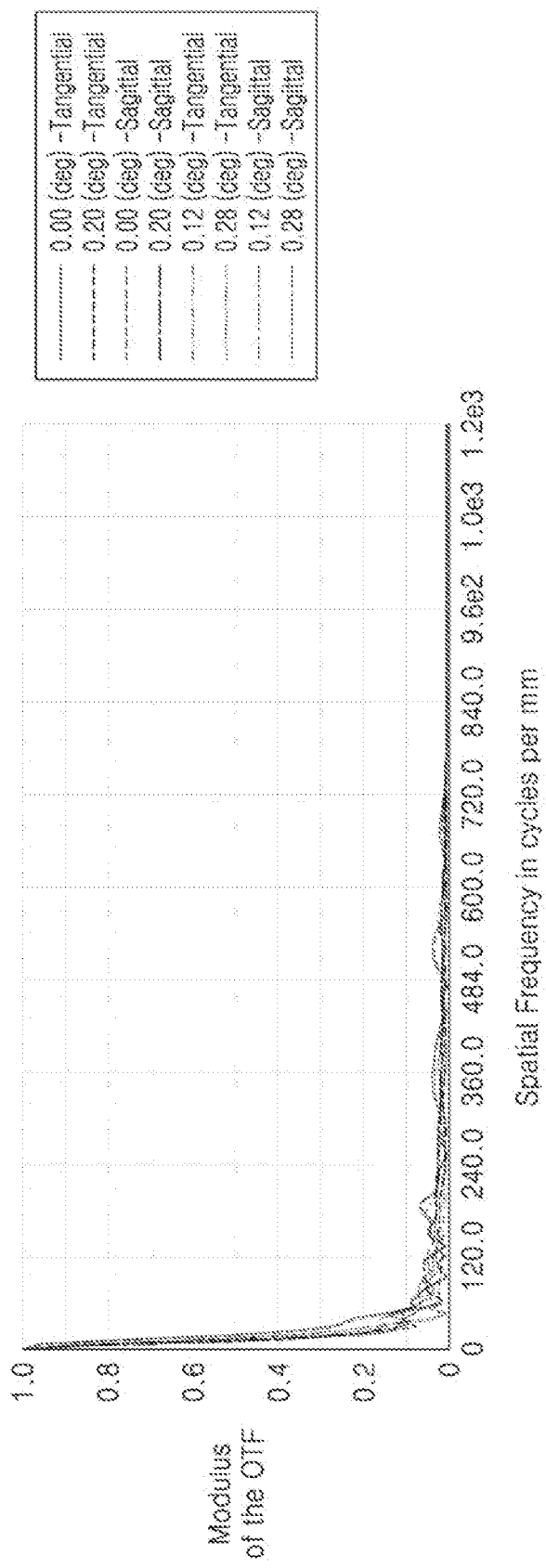

FIGS. 12 and 13 are a ray fan graph and a module transfer function (MTF) graph according to the incident angle obtained when using a comparative example refractive lens that does not include the metalens 1110 and the adhesive layer 1170 at the position of the optical hybrid lens 1100 in the lens assembly 1000 of the imaging device of FIG. 9.

FIG. 12 shows a ray fan for red light, green light, and blue light when the incident angle of light incident from the object plane to the lens assembly of the comparative example is 0.00 degrees, 12.00 degrees, 20.00 degrees, 28.00 degrees, 36.00 degrees and 40.00 degrees, respectively and the aberrations ex and ey in each direction along the x direction Px and they direction Py. FIG. 13 shows the tangential and sagittal MTF when the incident angle of light incident from the object surface to the lens assembly of the comparative example is 0.00 degrees, 12.00 degrees, 20.00 degrees, 28.00 degrees, 36.00 degrees, and 40.00 degrees, respectively.

As shown in FIGS. 12 and 13, in the lens assembly of the comparative example in which only a refractive lens is applied instead of the optical hybrid lens 1100, overall, it can be seen that chromatic aberration, for example, lateral chromatic aberration and vertical chromatic aberration, occur significantly.

A lens assembly including an optical hybrid lens to which a metalens is applied may be mounted and used in an electronic device (such as an optical device, and the like). In addition to the image sensor, the electronic device may further include an application processor AP, and it is possible to control a plurality of hardware or software components connected to the application processor AP by driving an operating system or application program through the application processor AP, and perform various data processing and computational operations. The application processor AP may further include a Graphic Processing Unit (GPU) and/or an image signal processor. When the image signal processor is included in the application processor AP, the image (or picture) acquired by the image sensor may be stored and/or outputted using the application processor AP.

A lens assembly including an optical hybrid lens to which a metalens is applied can be applied to various electronic devices. For example, a lens assembly including an optical hybrid lens to which a metalens is applied may be mounted on electronic devices such as smartphones, wearable devices, Internet of Things (IoT) devices, home appliances, tablet Personal Computers (PCs), Personal Digital Assistants (PDAs), Portable Multimedia Players (PMPs), navigations, drones, robots, driverless vehicles, autonomous vehicles, and Advanced Drivers Assistance System (ADAS).

Figure 14:
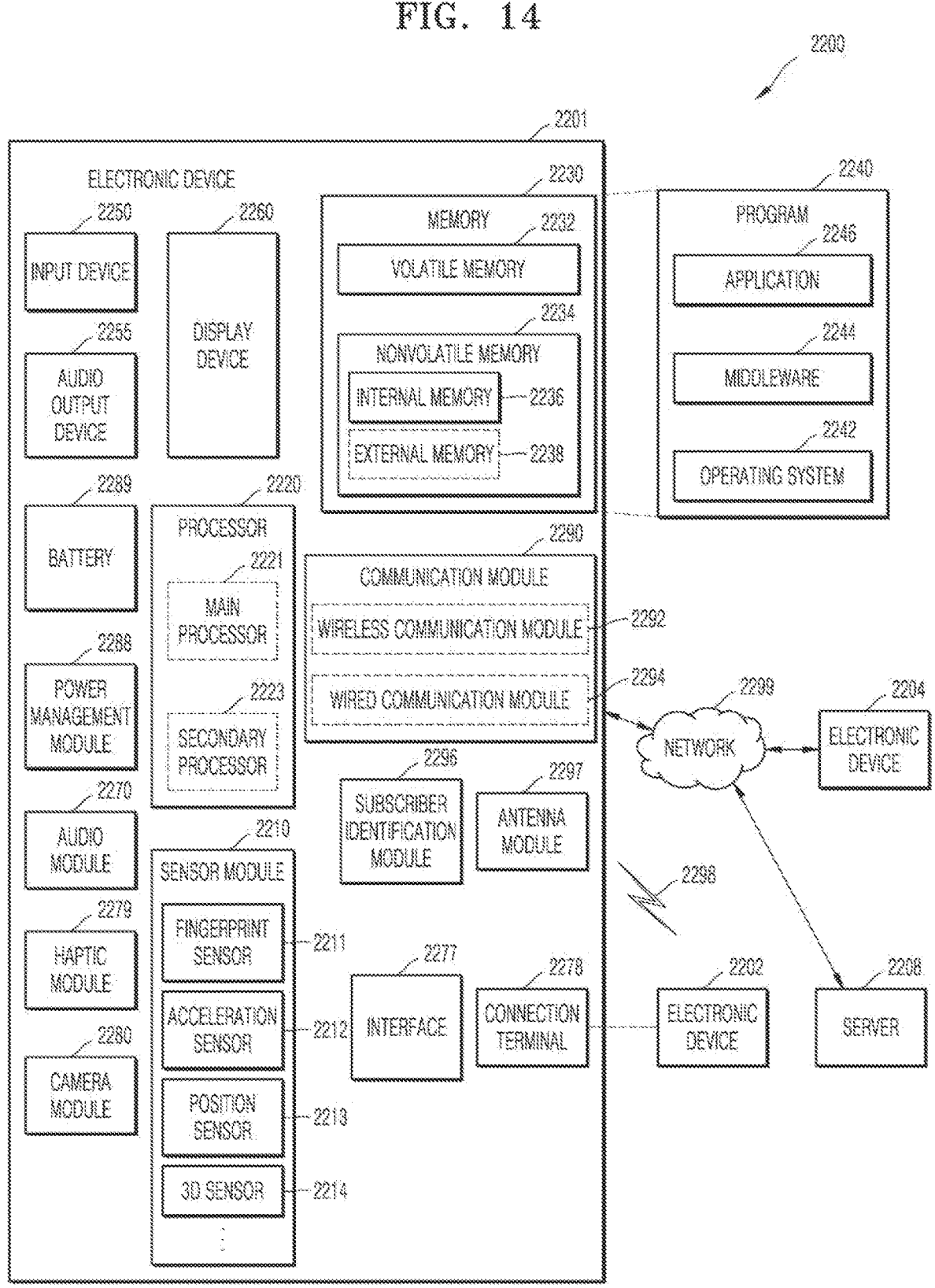
FIG. 14 is a block diagram showing a schematic configuration of an electronic device according to an embodiment.

FIG. 14 is a block diagram showing a schematic configuration of an electronic device according to an embodiment.

Referring to FIG. 14, in a network environment 2200, an electronic device 2201 may communicate with another electronic device 2202 through a first network 2298 (such as a short-range wireless communication network, and the like), or communicate with another electronic device 2204 and/or a server 2208 through a second network 2299 (such as a remote wireless communication network, and the like). The electronic device 2201 may communicate with the electronic device 2204 through the server 2208. The electronic device 2201 may include a processor 2220, a memory 2230, an input device 2250, an audio output device 2255, a display device 2260, an audio module 2270, a sensor module 2210, and an interface 2277, a haptic module 2279, a camera module 2280, a power management module 2288, a battery 2289, a communication module 2290, a subscriber identification module 2296, and/or an antenna module 2297. In the electronic device 2201, some of these components (such as the display device 2260) may be omitted or other components may be added. Some of these components can be implemented as one integrated circuit. For example, the fingerprint sensor 2211 of the sensor module 2210, an iris sensor, an illuminance sensor, or the like may be implemented by being embedded in the display device 2260 (such as a display, and the like).

The processor 2220 may execute software (such as the program 2240, and the like) to control one or a plurality of other components (such as hardware, software components, and the like) of the electronic device 2201 connected to the processor 2220, and perform various data processing or computational operations. As part of data processing or computational operation, the processor 2220 may load commands and/or data received from other components (such as the sensor module 2210, the communication module 2290, and the like) into the volatile memory 2232, process commands and/or data stored in the volatile memory 2232, and store result data in the nonvolatile memory 2234. The processor 2220 may include a main processor 2221 (such as a central processing unit, an application processor, and the like) and a secondary processor 2223 (such as a graphics processing unit, an image signal processor, a sensor hub processor, a communication processor, and the like) that can be operated independently or together. The secondary processor 2223 may use less power than the main processor 2221 and may perform specialized functions.

The secondary processor 2223 may control functions and/or states related to some of the components of the electronic device 2201 (such as the display device 2260, the sensor module 2210, the communication module 2290, and the like) instead of the main processor 2221 while the main processor 2221 is in an inactive state (sleep state), or with the main processor 2221 while the main processor 2221 is in an active state (application execution state). The secondary processor 2223 (such as an image signal processor, a communication processor, and the like) may be implemented as part of other functionally related components (such as the camera module 2280, the communication module 2290, and the like).

The memory 2230 may store various data required by components of the electronic device 2201 (such as the processor 2220, the sensor module 2276, and the like). The data may include, for example, software (such as the program 2240, and the like) and input data and/or output data for commands related thereto. The memory 2230 may include a volatile memory 2232 and/or a nonvolatile memory 2234.

The program 2240 may be stored as software in the memory 2230 and may include an operating system 2242, a middleware 2244, and/or an application 2246.

The input device 2250 may receive commands and/or data to be used for components (such as the processor 2220, and the like) of the electronic device 2201 from outside (a user, and the like) of the electronic device 2201. The input device 2250 may include a microphone, a mouse, a keyboard, and/or a digital pen (such as a stylus pen).

The audio output device 2255 may output an audio signal to the outside of the electronic device 2201. The audio output device 2255 may include a speaker and/or a receiver. The speaker can be used for general purposes such as multimedia playback or recording playback, and the receiver can be used to receive incoming calls. The receiver may be combined as a part of the speaker or may be implemented as an independent separate device.

The display device 2260 may visually provide information to the outside of the electronic device 2201. The display device 2260 may include a display, a hologram device, or a projector and a control circuit for controlling the device. The display device 2260 may include a touch circuit set to sense a touch, and/or a sensor circuit (such as a pressure sensor) set to measure the strength of a force generated by the touch.

The audio module 2270 may convert sound into an electrical signal, or conversely, may convert an electrical signal into sound. The audio module 2270 may acquire sound through the input device 2250 or output sound through speakers and/or headphones of the audio output device 2255, and/or another electronic device (such as the electronic device 2202) directly or wirelessly connected to electronic device 2201.

The sensor module 2210 may detect an operating state (such as power, temperature, and the like) of the electronic device 2201 or an external environmental state (such as a user's state, and the like), and generate an electrical signal and/or data value corresponding to the detected state. The sensor module 2210 may include a fingerprint sensor 2211, an acceleration sensor 2212, a position sensor 2213, a 3D sensor 2214, and the like, and in addition may include an iris sensor, a gyro sensor, an atmospheric pressure sensor, a magnetic sensor, a grip sensor, a proximity sensor, a color sensor, an infrared (IR) sensor, a biometric sensor, a temperature sensor, a humidity sensor, and/or an illuminance sensor.

The 3D sensor 2214 may irradiate a predetermined light onto an object and analyze the reflected light from the object to sense the shape and movement of the object.

The interface 2277 may support one or more specified protocols that may be used for the electronic device 2201 to connect directly or wirelessly with another electronic device (such as the electronic device 2202). The interface 2277 may include a High Definition Multimedia Interface (HDMI), a Universal Serial Bus (USB) interface, an SD card interface, and/or an audio interface.

The connection terminal 2278 may include a connector through which the electronic device 2201 can be physically connected to another electronic device (such as the electronic device 2202). The connection terminal 2278 may include an HDMI connector, a USB connector, an SD card connector, and/or an audio connector (such as a headphone connector).

The haptic module 2279 may convert an electrical signal into a mechanical stimulus (such as vibration, movement, and the like) or an electrical stimulus that a user can perceive through a tactile or movement sense. The haptic module 2279 may include a motor, a piezoelectric element, and/or an electrical stimulation device.

The camera module 2280 may capture a still image and a video. The camera module 2280 may include a lens assembly 2310 including one or more lenses, image sensors 2330, image signal processors 2360, and/or flashes 2320. The lens assembly 2310 included in the camera module 2280 may collect light emitted from an object to be imaged, and the lens assembly 2310 may include an optical hybrid lens according to the above-described embodiments to which a metalens is applied.

The power management module 2288 may manage power supplied to the electronic device 2201. The power management module 2288 may be implemented as a part of a Power Management Integrated Circuit (PMIC).

The battery 2289 may supply power to components of the electronic device 2201. The battery 2289 may include a non-rechargeable primary cell, a rechargeable secondary cell, and/or a fuel cell.

The communication module 2290 may support establishing a direct (wired) communication channel and/or a wireless communication channel, and performing communication through the established communication channel between the electronic device 2201 and other electronic devices (such as the electronic device 2202, the electronic device 2204, the server 2208, and the like). The communication module 2290 may include one or more communication processors that operate independently to the processor 2220 (such as an application processor) and support direct communication and/or wireless communication. The communication module 2290 may include a wireless communication module 2292 (such as a cellular communication module, a short-range wireless communication module, a Global Navigation Satellite System (GNSS) communication module, and the like) and/or a wired communication module 2294 (such as a local area network (LAN) communication module, a power line communication module, and the like). Among these communication modules, a corresponding communication module may communicate with other electronic devices through a first network 2298 (a short-range communication network such as Bluetooth, WiFi Direct, or Infrared Data Association (IrDA)) or a second network 2299 (a cellular network, the Internet, or a telecommunication network such as a computer network (such as LAN, WAN, and the like)). These various types of communication modules may be integrated into one component (such as a single chip, and the like), or may be implemented as a plurality of separate components (a plurality of chips). The wireless communication module 2292 may check and authenticate the electronic device 2201 in a communication network such as the first network 2298 and/or the second network 2299 using the subscriber information (such as international mobile subscriber identifier (IMSI), and the like) stored in the subscriber identification module 2296.

The antenna module 2297 may transmit signals and/or power to the outside (such as other electronic devices) or receive signals and/or power from the outside. The antenna may include a radiator composed of a conductive pattern formed on a substrate (such as PCB, and the like). The antenna module 2297 may include one or a plurality of antennas. When multiple antennas are included, an antenna suitable for a communication method used in a communication network such as the first network 2298 and/or the second network 2299 may be selected from the plurality of antennas by the communication module 2290. Signals and/or power may be transmitted or received between the communication module 2290 and another electronic device through the selected antenna. In addition to the antenna, other components (such as RFIC, and the like) may be included as part of the antenna module 2297.

Some of the components are connected to each other and may exchange signals (such as commands, data, and the like) through communication method between peripheral devices (such as bus, General Purpose Input and Output (GPIO), Serial Peripheral Interface (SPI), Mobile Industry Processor Interface (MIPI), and the like).

The command or data may be transmitted or received between the electronic device 2201 and the external electronic device 2204 through the server 2108 connected to the second network 2299. The other electronic devices 2202 and 2204 may be the same or different types of devices as or from the electronic device 2201. All or some of the operations executed by the electronic device 2201 may be executed by one or more of the other electronic devices 2202, 2204, and 2208. For example, when the electronic device 2201 needs to perform a certain function or service, instead of executing the function or service itself, the electronic device 2201 may request one or more other electronic devices to perform part or all of the function or the service. One or more other electronic devices that receive the request may execute an additional function or service related to the request, and transmit a result of the execution to the electronic device 2201. For this, cloud computing, distributed computing, and/or client-server computing technology may be used.

Figure 15:
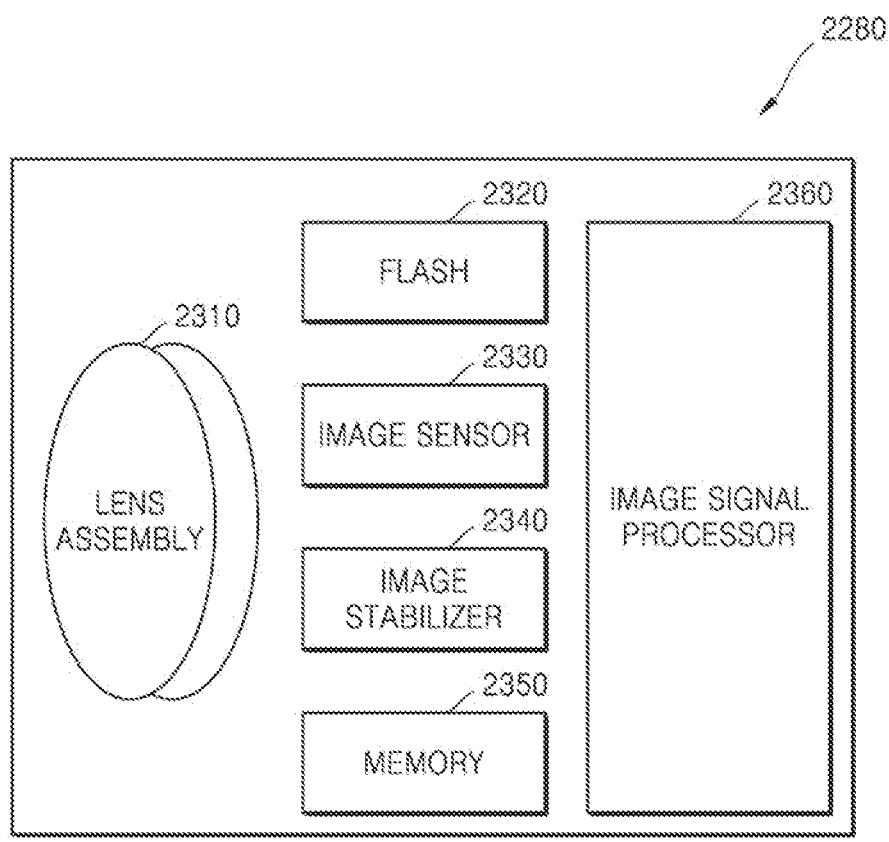
FIG. 15 is a block diagram illustrating a schematic configuration of a camera module included in the electronic device of FIG. 14.

FIG. 15 is a block diagram illustrating a schematic configuration of a camera module 2280 included in the electronic device of FIG. 14.

Referring to FIG. 15, the camera module 2280 may include a lens assembly 2310, a flash 2320, an image sensor 2330, an image stabilizer 2340, a memory 2350 (buffer memory, etc.), and/or an image signal processor 2360. The lens assembly 2310 may collect light emitted from an object to be imaged, and may include an optical hybrid lens including a metalens as above-described. The lens assembly 2310 may include an optical hybrid lens including a metalens and one or more refractive lenses. By applying the optical hybrid lens including the meta-lens, the lens assembly 2310 may implement desired optical performance and may have a short optical length.

In addition, the camera module 2280 may further include an actuator. The actuator may drive a position of lens elements constituting the lens assembly 2310 for zooming and/or autofocus (AF), and adjust a separation distance between the lens elements.

The camera module 2280 may include a plurality of lens assemblies 2310, and in this case, the camera module 2280 may be a dual camera, a 360 degree camera, or a spherical camera. Some of the plurality of lens assemblies 2310 may have the same lens properties (such as angle of view, focal length, auto focus, F number, optical zoom, and the like), or may have different lens properties. The lens assembly 2310 may include a wide-angle lens or a telephoto lens.

The flash 2320 may emit light used to enhance light emitted or reflected from an object. The flash 2320 may include one or more light emitting diodes (such as Red-Green-Blue (RGB)) LED, White LED, Infrared LED, Ultra-violet LED, and the like), and/or a Xenon Lamp. The image sensor 2330 may acquire an image corresponding to the object by converting light emitted or reflected from the object and transmitted through the lens assembly 2310 into an electrical signal. The image sensor 2330 may include one or a plurality of sensors selected from image sensors having different properties such as an RGB sensor, a black and white (BW) sensor, an IR sensor, or a UV sensor. Each of the sensors included in the image sensor 2330 may be implemented, for example, as a charged coupled device (CCD) sensor and/or a complementary metal oxide semiconductor (CMOS) sensor.

The image stabilizer 2340 may move one or a plurality of lenses included in the lens assembly 2310 or image sensors 2330 in a specific direction in response to the movement of the camera module 2280 or the electronic device 2301 including the same, and may control the operating characteristics of the image sensor 2330 (such as adjusting a read-out timing, and the like) to compensate for a negative effect due to movement. The image stabilizer 2340 may detect movement of the camera module 2280 or the electronic device 2301 using a gyro sensor or an acceleration sensor disposed inside or outside the camera module 2280. The image stabilizer 2340 may be implemented optically.

The memory 2350 may store some or all data of an image acquired through the image sensor 2330 for a next image processing operation. For example, when a plurality of images are acquired at high speed, the acquired original data (such as Bayer-Patterned data, high resolution data, and the like) is stored in the memory 2350, and after displaying only low-resolution images, it may be used to transmit the original data of the selected image (such as user selection, and the like) to the image signal processor 2360. The memory 2350 may be integrated into the memory 2230 of the electronic device 2201 or may be configured as a separate memory operated independently.

The image signal processor 2360 may perform one or more image processing on an image acquired through the image sensor 2330 or image data stored in the memory 2350. One or more image processing may include depth map generation, three-dimensional modeling, panorama generation, feature point extraction, image synthesis, and/or image compensation (such as noise reduction, resolution adjustment, brightness adjustment, blurring, sharpening, softening, and the like). The image signal processor 2360 may perform control (such as exposure time control, read-out timing control, and the like) of components (such as the image sensor 2330, and the like) included in the camera module 2280. The image processed by the image signal processor 2360 may be stored again in the memory 2350 for further processing or may be provided to an external component of the camera module 2280 (such as the memory 2230, the display device 2260, the electronic device 2202, the electronic device 2204, the server 2208, and the like). The image signal processor 2360 may be integrated into the processor 2220 or may be configured as a separate processor operated independently from the processor 2220. When the image signal processor 2360 is configured as a processor separate from the processor 2220, the image processed by the image signal processor 2360 may be displayed through the display device 2260 after additional image processing by the processor 2220.

The electronic device 2201 may include a plurality of camera modules 2280 each having different properties or functions. In this case, one of the plurality of camera modules 2280 may be a wide-angle camera, and the other may be a telephoto camera. Similarly, one of the plurality of camera modules 2280 may be a front camera, and the other may be a rear camera.

The camera module 2280 described above may be mounted on various electronic devices. For example, the lens assembly 2280 may be mounted on electronic devices such as smartphones, wearable devices, Internet of Things (IoT) devices, home appliances, tablet Personal Computers (PCs), Personal Digital Assistants (PDAs), Portable Multimedia Players (PMPs), navigations, drones, and Advanced Drivers Assistance System (ADAS).

According to embodiments, by forming a metalens including a metasurface having a plurality of nanostructures with a shape dimension of a sub-wavelength so as to match the curvature of the curved lens surface of the refractive lens, a lens group with reduced total length and aberration can be configured.

Therefore, when configuring a lens assembly including the optical hybrid lens according to an embodiment, it is possible to achieve miniaturization of an imaging device and an electronic device to which such a lens assembly is applied, and a wide angle of view may be possible.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An optical hybrid lens comprising:
a refractive lens comprising a curved lens surface;
a metalens comprising at least one metasurface formed on the curved lens surface to follow the curved lens surface of the refractive lens; and
an adhesive layer between the curved lens surface of the refractive lens and the metalens,
wherein the at least one metasurface comprises a plurality of metasurfaces, each of the plurality of metasurfaces comprising a plurality of nanostructures having a dimension of a sub wavelength of incident light,
wherein the metalens further comprises a dielectric layer between adjacent metasurfaces of the plurality of metasurfaces, and
wherein each metasurface of the plurality of metasurfaces comprises:
a plurality of first nanostructures, each first nanostructure of the plurality of first nanostructures comprising a high refractive index column surrounded by a first material having a low refractive index; or a plurality of second nanostructures, each second nanostructure of the plurality of second nanostructures comprising a low refractive index column surrounded by a second material having a high refractive index.

2. The optical hybrid lens of claim 1, wherein the metalens is formed to match a curvature of the curved lens surface of the refractive lens.

3. The optical hybrid lens of claim 1, wherein the adhesive layer comprises an adhesive material that has at least one of optical transparency and a refractive index that matches a refractive index of the refractive lens.

4. The optical hybrid lens of claim 3, wherein the adhesive layer has a thickness of about 1 μm to about 50 μm.

5. The optical hybrid lens of claim 1, wherein the curved lens surface of the refractive lens comprises any one of a convex lens surface, a concave lens surface, and a composite curved lens surface.

6. The optical hybrid lens of claim 5, wherein the curved lens surface of the refractive lens comprises an aspherical surface, and wherein the metalens is formed to match the aspherical surface.

7. The optical hybrid lens of claim 1, further comprising a second dielectric layer between the metalens and the adhesive layer.

8. An imaging device comprising:

a lens assembly comprising the optical hybrid lens of claim 1 and at least one other refractive lens; and an image sensor configured to convert an optical image formed by the lens assembly into an electrical image signal.

* * * * *